(12) United States Patent
Caliendo, Jr. et al.

(10) Patent No.: US 11,003,398 B2
(45) Date of Patent: May 11, 2021

(54) PRINTER SYSTEM

(71) Applicant: Lenovo (Singapore) Pte. Ltd., Singapore (SG)

(72) Inventors: Neal Robert Caliendo, Jr., Raleigh, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/552,111

(22) Filed: Aug. 27, 2019

(65) Prior Publication Data

US 2021/0064303 A1 Mar. 4, 2021

(51) Int. Cl.
*H04N 1/00* (2006.01)
*G06F 3/12* (2006.01)

(52) U.S. Cl.
CPC .......... *G06F 3/1208* (2013.01); *G06F 3/1261* (2013.01)

(58) Field of Classification Search
CPC .............................. G06F 3/1208; G06F 3/1261
USPC ....................................................... 358/1.14
See application file for complete search history.

(56) References Cited

U.S. PATENT DOCUMENTS

2016/0062291 A1* 3/2016 Tao .................... G03G 15/6514
399/80

OTHER PUBLICATIONS

Ali et al., Printer Patterns Adhesion dependency on Contact Angle of Ink on Substrate, International Journal of Engineering & Technology, IJET-IJENS vol. 10, No. 01, pp. 72-75, Feb. 2010 (4 pages).
Lee et al., Engineering an Ink Jet Paper What's Involved, Proc. of IS&T's 46th Annual Conference: The Physics and Chemistry of Imaging Systems, May 15-20, 1994, Rochester, NewYork. (7 pages).
Johansson et al., Paper friction-influence of measurement conditions, TAPPI Journal, vol. 81, No. 5, pp. 175-183, May 1998 (9 pages).
Samsung Printer Xpress Brochure, 2014 (2 pages).
Rice, Stepper motor torque basics, Control Engineering, Mar. 26, 2018 (2 pages).
TAPPI Standard Draft, T 549 om-08, Coefficients of static and kinetic friction of uncoated writing and printing paper by use of the horizontal plane method, Apr. 30, 2013 (9 pages).
HP Manual, HP LaserJet 1010, 1012, 1015 series printer, 2003 (148 pages).
HP User's Guide, Color LaserJet 8500, 8500 N, 8500 DN Printer, 1997 (224 pages).
HP Printer Job Language Technical Reference Manual, 2003 (342 pages).
HP User Guide HP Officejet Pro 8600, 2014 (254 pages).

* cited by examiner

*Primary Examiner* — Saeid Ebrahimi Dehkordy
(74) *Attorney, Agent, or Firm* — Brian J. Pangrle

(57) ABSTRACT

A method can include receiving at least one sensor-based measurement that characterizes a transportable medium loaded in a printer system; determining that a match does not exist between a print job to be printed on a transportable medium and the characterized transportable medium loaded in the printer system; and responsive to the determining that the match does not exist, issuing a signal.

19 Claims, 9 Drawing Sheets

Inspection Circuitry 300

| Scale (Mass/Weight) (e.g., load cell, etc.) 304 | Dimension (e.g., rangefinder, etc.) 308 | Reflectance/Absorption (e.g., EM, acoustic, etc.) 312 |
|---|---|---|
| Camera (e.g., CCD, etc.) 316 | Durometer (e.g., mechanical finger, etc.) 320 | Wetting (e.g., microfluidics, etc.) 324 |
| Temperature (e.g., thermocouple, etc.) 328 | Humidity (e.g., moisture sensor, etc.) 332 | ID Circuitry (e.g., RFID, scanner, etc.) 336 |
| Other 340 | | |

| 1 | Are you at least 16 years old? ☐ Yes ☐ No | | |
|---|---|---|---|
| 2 | Check boxes that apply ☐ New Registration ☐ Name Change ☐ Address Change | | |
| 3 | Last Name | First Name | Middle | Suffix |
| 4 | Gender | 5 | Birth Date: Month Date Year |

PRINTER SYSTEM

TECHNICAL FIELD

Subject matter disclosed herein generally relates to printer systems.

BACKGROUND

A printer system can include one or more types of media that can be utilized for printing.

SUMMARY

A method can include receiving at least one sensor-based measurement that characterizes a transportable medium loaded in a printer system; determining that a match does not exist between a print job to be printed on a transportable medium and the characterized transportable medium loaded in the printer system; and responsive to the determining that the match does not exist, issuing a signal. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

FIG. 3 is a diagram of examples of types of inspection circuitry;

FIG. 4 is a diagram of examples of forms and labels;

DETAILED DESCRIPTION

Figure 1:
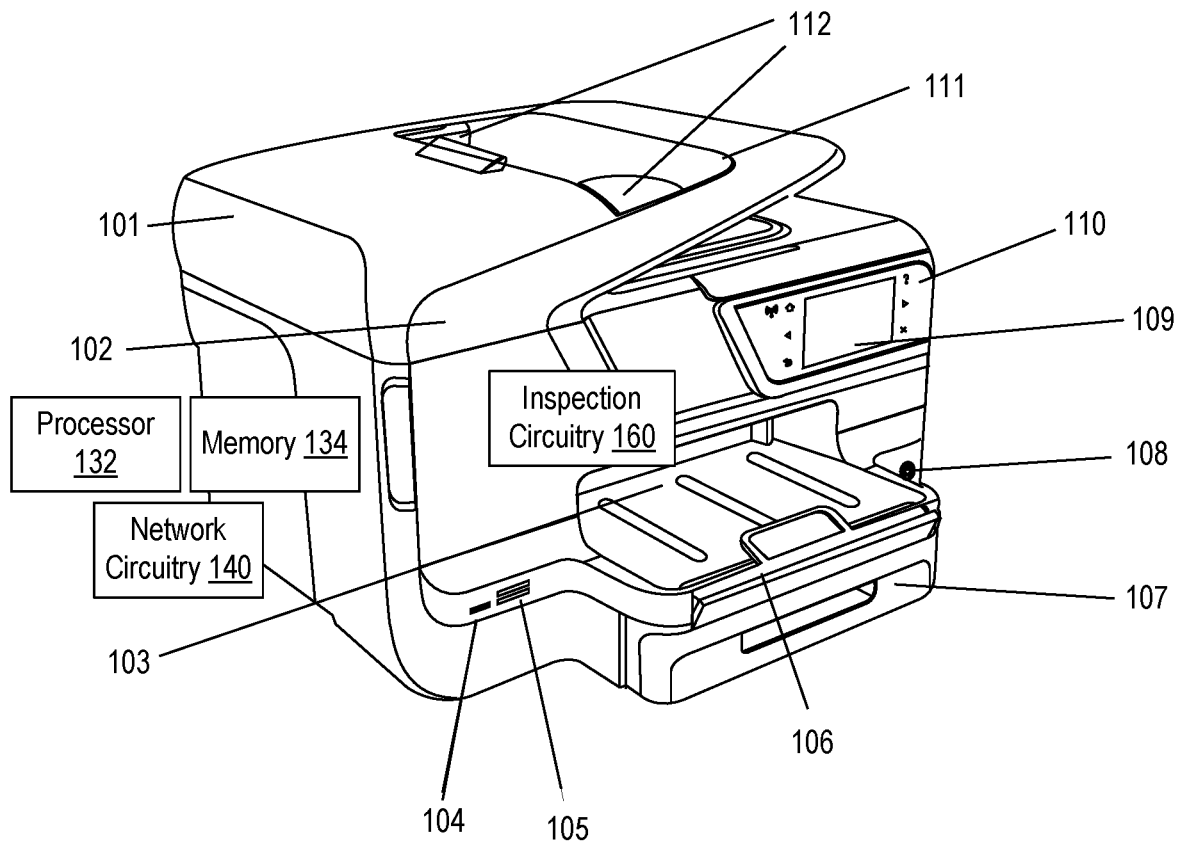
FIG. 1 is a diagram of an example of a printer system.

The following description includes the best mode presently contemplated for practicing the described implementations. This description is not to be taken in a limiting sense, but rather is made merely for the purpose of describing general principles of various implementations. The scope of invention should be ascertained with reference to issued claims.

Printer systems can include one or more of dot-matrix, ink-jet and laser technology. A dot-matrix printer system may utilize continuous feed media via form tractors and/or cut media, which may be fed via a feed mechanism. As an example, a dot-matrix printer system may include a platen that provides spring tension to hold the media in place and move it through the printer systems. As an example, form tractors may provide a more consistent feed mechanism by using pin-feed holes along the side of media to pull the media (e.g., blank paper, form paper, multiple part forms, etc.) through the printer system. Speed ratings for dot-matrix printer systems may range, for example, from approximately 32 to approximately 72 characters per second (cps). A print head in a dot-matrix printer system may get hot while in use.

Ink-jet, also known as bubble jet, printer systems tend to use an ink reservoir. An ink-jet printer system tends to be a non-impact printer system. As an example, an ink reservoir (or ink reservoirs) may be provided as a cartridge with one or more features (e.g., printing circuitry, microfluidics components, etc.). Some types of ink-jet printer systems include a print mechanism with a cartridge while other types do not.

Ink-jet printer systems can form characters by squirting ink using an ink-stream process, which may utilize, for example, tens of nozzles. As an example, print quality of an ink-jet printer system may be rated in dots per inch (dpi) where, the more dots used, the better the printed result (e.g., image, etc.). As an example, an ink-jet printer system may be specified by a dpi or a range of dpis (e.g., from 150 dpi to over 2800 dpi on photo-quality printer systems).

Ink-jet printer system speeds tend to be rated in pages per minute (ppm) rather than characters per second (cps) as an ink-jet printer system does not tend to form each character separately. Rather, an ink-jet printer system may print one line at a time across a page. In such an example, each printed line includes a portion of a print "image" oriented top to bottom. In some types of ink-jet printer systems, it may take several passes across a page to complete a complete line of text. Ink-jet printer system speeds may range from 2 ppm to 20 ppm or more, for example, depending on the number of colors and dpi being used.

An ink-jet printer system can include a print head stepper motor that moves a print head assembly (e.g., print head and ink cartridges) back and forth across a region where media can be position (e.g., a sheet of paper, etc.). As an example, a stepper motor may be dedicated to parking a print head assembly when the printer system is not in use for printing. Parking can handle a print head assembly such that it is restricted from accidental moving.

As an example, an ink-jet printer system can include a belt, which may be utilized to attach a print head assembly to a stepper motor. As an example, an ink-jet printer system can include a stabilizer bar where a print head assembly uses the stabilizer bar to ensure that movement is precise and controlled.

As an example, a media feed mechanism of an ink-jet printer system can be configured for cut sheets of media. For example, a cut sheet of paper may be fed from a stacked supply past a print head by a series of rollers that also clamp the cut sheet of paper. As an example, for an ink-jet printer system, printed pages may be stacked in a separate tray (e.g., a printed media tray), where a supply tray may be the source of media delivered to the printed media tray.

As an example, an ink-jet printer system can include a media tray and/or a feeder where the media may be a type of paper or other type of material (e.g., plastic, metal, etc.). As an example, consider a tray that can be loaded manually with media. As an example, consider a feeder that may snap open at an angle on a back of a printer system that allows for placing media in it. As an example, an ink-jet printer system can include one or more rollers that pull media in from a tray or a feeder and advance the media (e.g., when the print head assembly is ready for another pass, etc.). As an example, an ink-jet printer system may include a media feed stepper motor that may power one or more rollers to move media in precise increments to ensure a continuous "image" is printed.

As an example, an ink-jet and/or other type of printer system can include a power supply, control circuitry and one or more interface port(s). As to ports, various types of printer systems may utilize parallel ports and/or serial ports and/or parallel and serial ports. As an example, a USB port, a small computer system interface (SCSI) port, a wireless network port, a wired network port, etc., may be included in a printer system.

Laser printer systems tend to be page printers because they form and print text and/or graphics for one full sheet or page at a time. As an example, a laser printer system may use toner to create an "image" on a printed page. Toner tends to be a dry powder that includes iron particles coated with a plastic resin that bonds to the medium (e.g., paper) during a print process. As an example, a toner cartridge can include a photosensitive drum, a roller to develop a final image on a page and toner. As an example, to reduce running costs, toner may be supplied in a separate unit from the drum.

As an example, a laser printer system can include a drum, a high-voltage power supply, a DC power supply, a media transport sub-system, a primary corona, a transfer corona, fusing rollers, and a controller.

As an example, a printer system can include one or more scanners. Some examples of scanner include hand held (e.g., pen, camera, etc.), flat bed, sheet fed, drum and film. Various types of scanners can be described and differentiated by their resolution and/or color depth. As an example, resolution can be measured in dots per inch (dpi). As an example, color depth can be a number of colors the scanner is able to differentiate. As an example, a scanner might be described as 2400 dpi and 30 bits.

As an example, using program instructions (e.g., processor-executable instructions, etc.), a scanner may be operated at a desired specification, which may reduce size of a resulting image file (e.g., 10 KB, 1 MB, 10 MB, etc.). As an example, a scanner may include circuitry for interpolation where, for example, intermediate pixels can be created using neighboring pixels.

FIG. 1 shows an example of a printer system 100 that includes an automatic document feeder (ADF) 101, scanner glass 102, an output tray 103, a front universal serial bus (USB) port 104, a memory card slot 105, an output tray extension 106, a media tray 107, a power button 108, a control panel display 109, a control panel 110, a document feeder tray 111, and width guides 112 along with various other features. For example, the printer system 100 can include one or more facsimile ports (e.g., communication ports), one or more Ethernet ports, one or more additional ports, a power input connector (e.g., receptacle, etc.), and an automatic two-sided printing accessory (e.g., a duplexer, etc.).

As shown in the example of FIG. 1, the printer system 100 includes a processor 132 (e.g., one or more processors, controllers, ASICs, etc.), memory 134 operatively coupled to the processor 132, network circuitry 140 (e.g., wireless, wired, etc.) operatively coupled to the processor 132, and inspection circuitry 160, which may be operatively coupled to the processor 132 and, for example, to the network circuitry 140.

In the example of FIG. 1, the inspection circuitry 160 includes one or more sensors that can be utilized to determine one or more characteristics of media. For example, the printer system 100 can make one or more sensor-based measurements that can characterize a transportable medium or transportable media as loaded in the printer system 100 (e.g., in the tray 107, in a feeder, etc.).

As to control (e.g., via the processor 132, etc.), a control panel and/or control panel display can include a home button (e.g., to returns to a home screen from another screen), touch sensing circuitry (e.g., a touch screen to select menu options such as via icons rendered to a touch screen display, etc.), a help button (e.g., for a help menu), a keypad (e.g., for entry of numbers, text, etc.), a wireless icon operatively coupled to wireless circuitry (e.g., an icon for 802.XX wireless features), a cancel button (e.g., to stops a job, exit a menu, exit settings, etc.), a right arrow button (e.g., to navigates through settings in one or more menus), a back button (e.g., to returns to a previous menu), a left arrow button (e.g., to navigates through settings in one or more menus).

As to media, a user may be instructed via printed instructions (e.g., paper, PDF document, etc.), for example, to use media that conforms to the printer specifications, to load only one type of media at a time into a tray or an automatic document feeder (ADF), to, when loading the tray(s) and the ADF, make sure the media are loaded correctly, to not overload the tray or the ADF, to prevent jams, poor print quality, and other printing problems, to avoid loading the following media in the trays or the ADF: multipart forms, media that is damaged, curled, or wrinkled, media with cutouts or perforations, media that is heavily textured, embossed, or does not accept ink well, media that is too lightweight or stretches easily, and media that contains staples or clips.

As an example, a process or processes of loading media can be for one or more of standard-size media, envelopes, cards, photo paper, custom-size media, etc. For example, with reference to the example printer system 100 of FIG. 1, to load standard-size media, a user may pull out the tray 107, insert the media print-side down in the center of the tray 107, make sure the stack of media aligns with a line on a width guide, and is not higher than a paper stack line on the guide, not load media while the printer is printing, slide the media guides in the tray 107 to adjust them for the media size that loaded, fully reinsert the tray 107 and then pull out the extension 106 on the output tray 107.

As an example, the inspection circuitry 160 can include one or more sensors that can detect one or more of a state of the tray 107, a state of the extension 106, a state of media, a type of media, a condition of media, etc.

As an example, the inspection circuitry 160 can include one or more sensors that can detect one or more of an overload tray, overloaded trays, an overloaded ADF, multipart forms, media that is damaged, media that is curled, media that is wrinkled, media with one or more cutouts, media with one or more perforations, media that is textured and degree of texturing, media that is embossed and degree of embossing, degree of media to accept ink, media weight (e.g., grams per square meter, "lb" weight, etc.), media elasticity (e.g., Young's modulus, stress-strain, etc.), metallic material in or coupled to media, plastic material in or coupled to media, etc.

As to media, a term such as paperweight may be utilized, which is a number that refers to thickness and sturdiness of the paper, not the actual weight of a sheet. For example, regular or "standard" copy paper may be referred to as a 20 lb. bond or referred to as a 50 lb. text weight. As mentioned, a term that can be utilized is grams per square meter (GSM), which is the actual weight of a sheet. For example, 74 GSM can correspond to 20 lb bond/50 lb text; 90 GSM to 24 lb bond/60 lb text (e.g., multipurpose paper used in an office printer for business letterhead or as stationary weight); 105 GSM to 28 lb bond/70 lb text (e.g., brochures and presentations, 2-sided printing with minimal show through); 120 GSM to 32 lb bond/80 lb text (e.g., brochures and presentations, 2-sided printing with minimal show through, while being slightly heavier than the 281*b*); 145 GSM to 67 lb Bristol (e.g., considered the lightest of the cardstocks, for self-mailers with a flexible soft feel quick drying surface); 165 to 90 lb index (e.g., a durable cardstock with a smooth, hard surface for medium applications); 175 GSM to 65 lb cover (e.g., a sturdy stock with a high quality soft feel fast drying surface, for postcards, menus and posters); 200 GSM to 110 lb index (e.g., 90 lb and 110 lb index can be for tabs, dividers and manila folders, average weight of an index card for heavier applications); 215 GSM to 80 lb cover (e.g., a heavy cardstock, for business card weight, a wide variety of textures and finishes); 255 GSM to 140 lb index (e.g., for super heavy weight applications); and 260 GSM to 100 lb cover (e.g., a noticeably heavier cardstock often used for flat cards or invitations).

Various media properties can affect image transfer and image appearance, which may be characterized via one or more print quality metrics (e.g., contrast, density, color, tonal range, and surface uniformity). Interactions between media and print substance(s) (e.g., ink, toner, etc.) can involve porosity, roughness, optical properties (e.g., whiteness, opacity, light scattering, and gloss), and mechanical properties, which may depend on one or more transport components and operation thereof.

The printability of a medium's surface can be influenced by surface properties such as smoothness, uniformity and absorption. As an example, surface tension (e.g., interfacial tension) may be a factor, which can be related to wetting. As an example, electrical charge can be a factor where, for example, a print substance has or can acquire an electrical charge.

As to paper as a medium, high print quality may be associated with good formation and with smooth, compressible paper. Important characteristics of paper can include roughness, formation, porosity and air permeability. Roughness and formation can be considered as external surface properties, while pore size, porosity and permeability can be categorized as internal surface properties. Roughness can affect ink gloss and color, as well as print contrast. Formation is an indicator of how uniformly fibers and/or fillers are distributed in paper (e.g., sheet by sheet, a region of sheet, etc.). Various paper properties depend on formation. As an example, a poorly "formed" sheet of paper can exhibit more weak and thin or thick regions. Paper formation tends to affect paper printing characteristics. The porosity of paper can affects properties such as apparent density, compressibility, resiliency, and the ability to absorb one or more substances. Various uncoated printing and writing papers are considered moderately porous, whereas coated printing papers, when well-formed, tend to be relatively nonporous. Air permeability can be an indicator that shows how printing inks will penetrate and spread.

As an example, optical properties of a medium can influence the visual quality of a printed image and contribute to its appearance and appeal. Acceptable color reproduction can be promoted through use of media that are bright with uniform spectral reflection, smooth, glossy, and neutral shade. Optical properties can include gloss, opacity, whiteness, brightness, and color. Brightness and whiteness can be important factors for print contrast development. As an example, as brightness or whiteness increase, contrast between the medium and printed image can increase. Opacity, or ability to obstruct the passage of light, can be relevant for publication grade media. For example, too much show-through of printed images from the back side of the sheet will reduce print contrast and interfere with the visual appearance of the image. The gloss of a medium can affect the color of a print because it affects the way light is reflected from the print substance (e.g., ink, toner, etc.). To maintain uniform color printing throughout a job, variations in gloss may be monitored and kept to a minimum level. Glossy media tend to be associated with high surface smoothness and good printing quality.

As an example, a printer system may be adapted for use of particular types of envelopes, which may include or be foldable to form a "pocket" for insertion of one or more items therein.

Consider a printer system that can be loaded with one or more envelopes by pulling out a tray and insert the envelopes print-side down, while making sure that a stack of envelopes does not exceed a line marking in the tray, followed by sliding media guides in the tray to adjust them for the media size loaded, and then reinserting the tray. In such an example, a user may pull out an extension on an output tray, if the printer system is configured with such an output tray.

As an example, a printer system may include an adjustable tray or feeder for envelopes and other shapes and another type of tray or feeder for standard sized sheets (e.g., 8.5 inch by 11 inch, A4, etc.). As an example, a tray or a feeder may include guides that can be adjusted, manually and/or automatically, as to shape and/or size of media.

As to some standard media sizes, consider letter (216×279 mm; 8.5×11 inches and 216×330 mm; 8.5×13 inches), legal (216×356 mm; 8.5×14 inches), A4 (210×297 mm; 8.3×11.7 inches), executive (184×267 mm; 7.25×10.5 inches), statement (140×216 mm; 5.5×8.5 inches), B5 (JIS) (182×257 mm; 7.17×10.12 inches), A5 (148×210 mm; 5.8×8.3 inches), #10 Envelope (105×241 mm; 4.12×9.5 inches), monarch envelope (98×191 mm; 3.88×7.5 inches), card envelope (111×152 mm; 4.4×6 inches), A2 envelope (111×146 mm; 4.37×5.75 inches), DL envelope (110×220 mm; 4.3×8.7 inches), C5 envelope (162×229 mm; 6.4×9 inches), C6 Envelope (114×162 mm; 4.5×6.4 inches), Japanese envelope chou #3 (120×235 mm; 4.7×9.3 inches), Japanese envelope chou #4 (90×205 mm; 3.5×8.1 inches), index card (76.2× 127 mm; 3×5 inches), index card (102×152 mm; 4×6 inches), index card (127×203 mm; 5×8 inches), A6 card (105×148.5 mm; 4.13×5.83 inches), A4 index card (210× 297 mm; 8.3×11.7 inches), Hagaki (100×148 mm; 3.9×5.8 inches), Ofuku Hagaki (200×148 mm; 7.8×5.8 inches), index card letter (216×279 mm; 8.5×11 inches), photo media (76.2×127 mm; 3×5 inches), photo media (102×152 mm; 4×6 inches), photo media (5×7 inches), photo media (8×10 inches), photo media (8.5×11 inches), photo L (89×127 mm; 3.5×5 inches), photo 2L (127×178 mm), custom-sized media between 76.2 to 216 mm wide and 127 to 356 mm long (3 to 8.5 inches wide and 5 to 14 inches long), custom-sized media (ADF) between 127 to 216 mm wide and 127 to 355 mm long (5 to 8.5 inches wide and 5 to 14 inches long), etc.

As an example, a printer system can include tray specifications, for example, consider tray specification such as tray 1: paper 60 to 105 GSM (16 to 28 lb bond), up to 250 sheets of plain paper (25 mm or 1 inch stacked); photo media 280 GSM (75 lb bond), up to 100 sheets (17 mm or 0.67 inch stacked); envelopes 75 to 90 GSM (20 to 24 lb bond envelope), up to 30 sheets (17 mm or 0.67 inch stacked); and cards up to 200 GSM (110 lb index), up to 80 cards. Consider another example as to tray 2: plain paper only 60 to 105 GSM (16 to 28 lb bond), up to 250 sheets of plain paper (25 mm or 1.0 inch stacked). And, consider specifications such as duplexer plain and brochure 60 to 105 GSM (16 to 28 lb bond).

Figure 2:
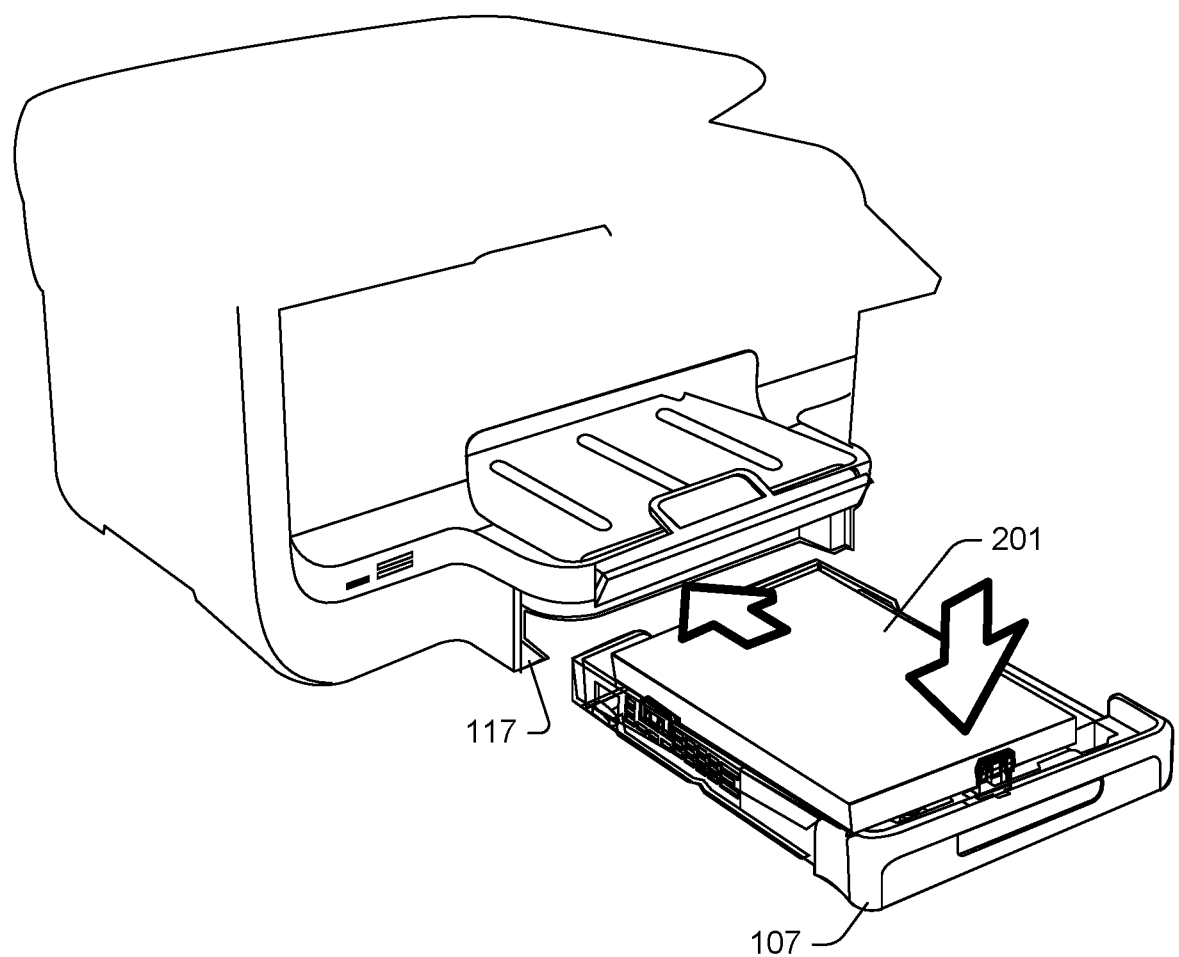
FIG. 2 is a diagram of an example of a printer system.

FIG. 2 shows the printer system 100 of FIG. 1 with the tray 107 extended outwardly away from a tray receptacle 117 of the printer system 100. As shown, a stack of sheets 201 is disposed in the tray 107 where each of the sheets 201 can be of a certain medium. A sheet may be referred to as a medium or print media. A sheet or sheets, as mentioned, can be characterized by one or more physical properties.

As an example, a stack of sheets of a certain medium may be expected to be of a determinable weight (e.g., mass) and of a determinable height. For example, if a sheet is of X mm in width, Y mm in length and Z mm in height and 90 GSM, a mass or weight per sheet may be calculated and, for a given number of sheets, a stack mass (or stack weight) and a stack height may be calculated.

FIG. 3 shows some examples of inspection circuitry 300, which may be included in a printer system such as the printer system 100 of FIG. 1, or one or more other printer systems (e.g., dot-matrix, laser jet, etc.), for example, as part of the inspection circuitry 160. As shown in FIG. 3, the inspection circuitry 300 can include one or more sensors such that one or more sensor-based measurements can be made by a printer system. As an example, one or more types of circuitry may be utilized to characterize a medium loaded in a printer system where such characterization may be destructive or non-destructive. For example, a non-destructive approach can characterize a medium (e.g., a sheet, etc.) where that medium remains suitable for use (e.g., for a print job); whereas, a destructive approach may cause some amount of damage to a medium (e.g., a sheet, etc.) where that medium, depending on the nature and/or position(s) of the damage may be unsuitable for use (e.g., for a print job). As an example, a printer system may include components for non-destructive characterization and/or destructive characterization. As an example, a printer system may include circuitry that can select a technique from one or more non-destructive techniques and/or from one or more destructive techniques. As an example, a printer system may include circuitry that can select a destructive technique responsive to results of a non-destructive technique (e.g., where a level of uncertainty exists, etc.).

As an example, where a printer system processes a test medium or test media (e.g., a test ream, etc.), the printer system may perform one or more non-destructive techniques and/or one or more destructive techniques to characterize the test medium or test media (e.g., consider calibrating, learning, training, etc.). As test medium or test media may be intended for processing without subsequent use, a printer system may utilize one or more destructive techniques, which may generate results that can help to determine accuracy of one or more non-destructive techniques. For example, consider a non-destructive technique that utilizes image capture and image analysis to determine whether a sheet is standard copy/printer paper or glossy photographic quality paper. Such an analysis may be confirmed or otherwise assessed via a destructive technique, which can include deformation of the sheet (e.g., bending, punching, stretching, etc.). In such an example, the glossy photographic quality paper may be stiffer, less flexible, etc., than the standard copy/printer paper, which can be utilized to confirm that the image capture and/or the image analysis performed acceptably in identifying the sheet as being glossy photographic quality paper (e.g., as may be loaded as part of a test, etc.). As an example, a printer system can include an operational mode for print jobs that can utilize one or more non-destructive techniques for characterizing one or more types of media and a test mode, which may include one or more options for utilizing one or more destructive techniques for characterizing one or more types of media. As an example, a printer system can include circuitry for one or more types of print job analyses, which, for example, may optionally be utilized in a standalone approach for decision making or, for example, may be utilized in combination with one or more types of media analyses.

As shown in FIG. 3, inspection circuitry 300 can include one or more of scale circuitry 304 (e.g., a load cell, etc.), dimension circuitry 308 (e.g., a rangefinder, etc.), reflection and/or absorption circuitry 312 (e.g., EM, acoustic, etc.), camera circuitry 316 (e.g., a CCD array, etc.), durometer circuitry 320 (e.g., a mechanical finger, etc.), wetting circuitry 324 (e.g., microfluidics, etc.), temperature circuitry 328 (e.g., a thermocouple, etc.), humidity circuitry 332 (e.g., a moisture sensor, etc.), ID circuitry 336 (e.g., RFID, scanner such as laser scanner, etc.) and one or more other types of circuitry 340.

As to the scale circuitry 304, it can determine a mass (e.g., or weight) of one or more sheets of media, which may be in one or more forms. For example, consider a sheet of paper, an envelope made of paper, etc. The scale circuitry 304 can include a load cell that can be utilized to determine force applied by a sheet or a stack of media. As an example, a load cell can include a strain gauge that measures change in electrical resistance when a force is applied. A strain gauge may be made up of fine wire, or foil, set up in a grid pattern in a way that produces a linear change in resistance when strain is applied along one axis. As an example, a strain gauge may be for tension, compression or tension and compression. Tension force may cause a strain gauge to get thinner and longer, increasing the resistance; whereas, compression force may cause the strain gauge to get thicker and shorter, decreasing resistance. As an example, a strain gauge can be bonded to a thin backing (carrier), which is attached directly to a load cell enabling the strain of the load cell to be experienced by the strain gauge.

As an example, a tray of a printer system can include one or more load cells, one or more strain gauges, etc. As an example, a tray may include one or more spring mechanisms that experience compression and/or tension when a stack of media is loaded in the tray. As an example, the printer system can measure mass (e.g., weight) and utilize the measured mass to characterize a sheet and/or a stack of media loaded in a tray. As an example, a stack height measurement per the dimension circuitry 308 may be utilized with the scale circuitry 304. As an example, consider utilizing dimensions and mass to determine a GSM value. In such an example, where the GSM value is not within a target range of a known GSM value, a printer system may indicate that an issue or issues exist with respect to media loaded in a tray. For example, consider sheets of media that differ in their GSM values. As to a target range, for example, a table of values may be stored in memory of a printer system where the table of values includes values for mixed stacks of media. In such an example, the printer system may estimate a scenario such as, for example, 20 sheets of 74 GSM and 80 sheets of 90 GSM are in the stack loaded in a tray of the printer system. In such an approach, a user may know what to expect when pulling out the tray, for example, by seeing two distinct portions of the stack where one portion is heavier (higher value GSM) than the other portion (lower value GSM). With such an expectation, the user may know how to separate the stack and where to place one of the portions (e.g., in a cabinet with media of the same character such as the same GSM). Without such information, the user may be uncertain as to what constitutes the different portions of a stack in a tray.

As to the dimension circuitry 308, it may include a rangefinder that can determine a height of a stack and/or one or more other dimensions of a stack. As an example, the dimension circuitry 308 may be operatively coupled to one or more adjustable guides. For example, consider a widthwise guide that can be adjusted automatically and/or by a user to guide widthwise sides of a sheet or sheets. Such guides may be operatively coupled to the dimension circuitry 308 such that a measurement can be made directly responsive to guide position. As an example, a guide may be operatively coupled to a resistance based circuit such as a potentiometer where a resistance value changes (e.g., or electrical value such as potential of a circuit changes) responsive to guide position.

As an example, a rangefinder may utilize one or more technologies (e.g., laser, radar, sonar, LIDAR, etc.). As an example, one or more types of circuitry may be suitable for making one or more types of measurements.

As an example, the reflectance and/or absorption circuitry 312 may be utilized to determine one or more dimensions. For example, consider a use of a sound wave, a laser beam, or other energy that can be aimed at a medium where reflected and/or absorbed energy is captured by one or more sensors (e.g., a microphone, a light sensor, etc.). In such an example, a distance between an emitter and a sheet may be determined as a dimension (e.g., a stack height, etc.).

As an example, the reflectance/absorption circuitry 312 may include spectrophotometer and/or colorimeter circuitry. For example, use of spectrophotometry as a quantitative measurement of the reflection or transmission properties of a material as a function of wavelength. Such an approach may utilize one or more of visible light, near-ultraviolet, near-infrared and one or more other types of EM energy. As to colorimetry, it can involve measurement of the absorbance of particular wavelengths of light by a material. Colorimetry may be utilized to quantify and describe physically one or more aspects of material, optionally with respect to human color perception. As an example, colorimetry may include reducing one or more spectra to physical correlates of color perception (e.g., color space values, etc.).

As an example, one or more types of inspection circuitry may be utilized to measure "brightness" of a sheet of medium. As an example, a sheet may include one or more types of optical brighteners, optical brightening agents (OBAs), fluorescent brightening agents (FBAs), or fluorescent whitening agents (FWAs), which are chemical compounds that absorb light in the ultraviolet and violet region (e.g., 340-370 nm) of the electromagnetic spectrum, and re-emit light in the blue region (e.g., 420-470 nm) by fluorescence. Fluorescent emission is a short-lived period of light emission by a fluorophore, unlike phosphorescence, which is long-lived. Such additives can enhance the appearance of color of material (e.g., fabric, paper, etc.), causing a "whitening" effect (e.g., making intrinsically yellow/orange materials look less so, by compensating the deficit in blue and purple light reflected by the material, with the blue and purple optical emission of the fluorophore).

As an example, a printer system can include a table of values of optical brightness for various types of media. As an example, inspection circuitry can include one or more types of sensors that can measure optical brightness where one or more measurements of such one or more types of sensors can be utilized to determine a type of medium. As an example, a printer system may utilize a coordinate approach with a plurality of variables and types of stored information where sensor-based values can be utilized to hone in on a particular type of medium that is present in a tray (e.g., a pull-out tray, a feeder tray, etc.).

As an example, the camera circuitry 316 may be utilized to determine one or more dimensions, for example, via analysis of one or more images. As an example, a camera assembly may include one or more features such as, for example, one or more of a flash, a rangefinder, an autofocus lens, etc. As an example, the camera circuitry 316 can include one or more CCD arrays. As an example, in a CCD array image sensor, pixels can be represented by p-doped metal-oxide-semiconductors (MOS) capacitors.

As to the durometer circuitry 320, it may include a mechanical finger or "indenter" that can be pressed against a sheet or a stack of sheets. A durometer may be a type of hardness tester that measures the depth of an indentation in a material created by a given force on a known indenter where the depth is dependent on the hardness of the material, its viscoelastic properties, the shape of the indenter, and the duration of the test. As an example, ASTM D2240 durometers allow for a measurement of initial hardness and/or indentation hardness after a given period of time. As an example, the durometer circuitry 320 can be utilized for applying force (e.g., in a consistent manner, without shock, etc.), and measuring the hardness (depth of the indentation). If a timed hardness is desired, force may be applied for a required time and then read.

As mentioned, the durometer circuitry 320 may be applied to a sheet or a stack of sheets. In such an example, where a stack height (e.g., a stack dimension representative of a number of the sheets) is available, such a measurement may be utilized in combination with depth of an indenter. In such an example, a table of values may be utilized that includes depths for various types of media and various numbers of sheets in a stack. For example, where an indenter provides a depth measurement of Z mm, that value may be utilized to search a look-up-table for a type of media and a number of sheets in a stack of such media. In such an example, if the stack height is available, it may be utilized to further refine a search of the look-up-table and/or to otherwise estimate the type of media and/or the number of sheets in a stack of such media.

As to the wetting circuitry 324, it may include one or more microfluidic channels that can deliver a substance to a surface of a sheet of medium or a stack of sheets. As an example, the substance may be volatile such that it evaporates without leaving a noticeable residue. In such an example, a droplet of the substance may be formed on the surface of a sheet and measurements made as to size of the droplet and/or as to an angle formed between the droplet and the surface of the sheet, either or both of which may be indicative of a surface tension. As an example, consider a contact angle measurement, which may be via one or more other types of circuitry such as a camera. The contact angle can be an indication of the type of medium, which may, for example, be related to one or more surfactants and/or surface charges of the type of medium. As an example, contact angle may be known for various types of media that are characterized for ink-jet printers as the contact angle between an ink droplet and a type of media may be a factor in print quality.

Components of ink-jet inks include vehicle (e.g., water, solvent, oil and/or UV-based), colorants, binders and additives. Ink-jet inks tend to display very low viscosity (e.g., 2-30 mPas) and surface tension (e.g., adjusted between 25-40 mN/m). Some factors that can affect ink-jet printing include surface energy, charge, roughness and porosity. As an example, the wetting circuitry 324 can provide for measurement of an initial contact angle of a substance on a sheet of a type of medium and one or more non-initial contact angles, which may provide for an indication of one or more characteristics of the sheet of the medium. For example, consider fiber structure as being related to how quickly a contact angle changes as a droplet of a substance is absorbed into the medium.

As to the temperature circuitry 328, it may be utilized to provide for calibration of one or more other types of circuitry and/or measurements. As to the humidity circuitry 332, it may be utilized to provide for calibration of one or more other types of circuitry and/or measurements, optionally in combination with temperature, etc.

As to the ID circuitry 336, a medium may include a code, which may be a printed code, an embedded code, a chip code, etc. For example, consider a printed code (e.g., a barcode, etc.) that can be read via a scanner such as a laser scanner. For example, the ID circuitry 336 can include barcode reader circuitry (e.g., a barcode scanner) that is an optical scanner that can read printed barcodes such that circuitry can decode data contained in the barcode. ID circuitry can include a light source, a lens and a light sensor conversion of optical impulses into electrical signals (e.g., digital data, etc.). As to radio-frequency identification (RFID) circuitry, one or more electromagnetic fields may be utilized to identify a tag of a medium (e.g., surface, embedded, etc.) where the tag includes electronically stored information. As an example, a tag may be passive and collect energy from emissions of an EM source, which may be part of a reader and/or one or more other sources. For example, consider a printer system that includes WIFI circuitry that emits EM energy that can be collected by a RFID tag that can, in turn, emit and/or alter such energy for collection by a reader (e.g., one or more antennas). In such an example, a tag may be configured for one or more dedicated WIFI frequencies (e.g., a WIFI ID tag) and/or for one or more dedicated RFID frequencies.

As an example, the ID circuitry 336 may utilize one or more near-field communication (NFC) protocols. NFC employs electromagnetic induction between two loop antennas when NFC-enabled devices (e.g., consider a smartphone and a printer system) exchange information (e.g., operating within a globally available unlicensed radio frequency ISM band of 13.56 MHz on ISO/IEC 18000-3 air interface at rates ranging from 106 to 424 kbit/s). As an example, a printer system can include EM circuitry such as RFID, WIFI, NFC, etc., that can emit energy that can be utilized to interact with circuitry of a medium where the circuitry of the medium may include a code such that the code can be determined via such interaction.

As to the other circuitry 340, it may include one or more types of non-destructive test circuitry and/or destructive test circuitry. As to the latter, consider a sensor that samples one or more portions of a sheet for analysis. In such an example, the sheet may no longer be suitable for use. For example, consider a punch, a corner cutter, etc., which can sample a portion of a sheet where the portion may be subjected to mechanical testing, chemical testing, energy-based testing, etc. As an example, a feed mechanism of a printer system may provide for transport of a sheet where inspection circuitry samples the sheet. For example, as a sheet is lifted from a stack, a sampler may cut a corner of the sheet where the cutting itself may be a mechanical test. For example, a determination may be made as to how much force was required to make the cut, a cutting time, etc. In such an example, one or more values may be utilized to determine the type of medium from which the sheet is made. Referring again to the durometer circuitry 320, consider an indenter that is utilized to apply a force that causes a rupture in a sheet such as a hole, a tear, etc. Such force, force versus time, strain versus stress, strain versus time, etc., may be utilized to determine a type of medium for that sheet. In such an example, the sheet may be "damaged" in a manner that does not cause a "jam" of a transport mechanism. For example, the sheet may be tested in a region that does not contact a roller directly, etc., in a manner that could lead to a transport issue of the sheet along a transport path.

As mentioned, various conditions may occur during operation of a printer system. Such conditions (e.g., or issues) can include an overload tray, overloaded trays, an overloaded ADF, multipart forms, media that is damaged, media that is curled, media that is wrinkled, media with one or more cutouts, media with one or more perforations, media that is textured and degree of texturing, media that is embossed and degree of embossing, degree of media to accept ink, media weight (e.g., grams per square meter, "lb" weight, etc.), media elasticity (e.g., Young's modulus, stress-strain, etc.), metallic material in or coupled to media, plastic material in or coupled to media, etc. As an example, one or more of the types of inspection circuitry 300 of FIG. 3 may be utilized to detect one or more conditions.

As explained, various types of issues can arise in a printer system or printer systems, which can include networked printer systems (e.g., operatively coupled to a network).

As an example, an issue may involve over-printing a pre-printed form when a blank sheet of paper is required, and vice versa. For example, if a preprinted form is inadvertently left in a stack and a user elects to print another report, the report prints on top of the form, potentially wasting the form, which may be relatively expensive compared to a non-form, blank sheet of paper.

While various printer systems can issue a notification to a user to insert a special form, such printer systems lack an ability to validate whether the form (or forms) were in fact loaded. And, it can be the responsibility of a user or users to switch back to blank sheets (e.g., blank pages) for subsequent printing or scanning.

A printer system such as the printer system 100 without the inspection circuitry 160 can execute printing on whatever types of medium (e.g., shape, size, material, etc.) that is loaded in a tray without determining one or more characteristics of the medium that is actually present (e.g., whether it is a form or not a form, whether it is a photographic quality medium or not, whether it is an envelope or not, whether it is labels or not, etc.).

As explained, a printer system can include one or more types of inspection circuitry for one or more purposes. For example, by including one or more cameras (e.g., camera circuitry) inside a printer system, a determination may be made as to a type of loaded medium prior to execution of printing on that loaded medium. For example, with one or more cameras inside a paper source (or sources) of a printer or scanner, a printer system can determine whether the next sheet to be fed into the printer transport path is a pre-printed form, a blank sheet, etc. Depending upon the requirement of the current print job (e.g., form versus blank sheet), the printer system can issue a notification that warns a user if there is a mismatch. In such an example, the notification may be rendered via a printer panel, via a network, etc. For example, consider a networked printer system where a notification is issued to at least the user that has submitted a request for a print job. As an example, a notification may be issued to a prior user, which may be the source of the issue because that user did not return the printer system to an appropriate state (e.g., by removing, replacing, etc., one or more media, etc.).

As an example, a system may analyze a print stream to determine a probability that a print job is intended for a pre-printed form. For example, a combination of the following (or additional) heuristics may be incorporated: a stream may consist of relatively short pieces of output that are scattered arbitrarily across the page, and appear to be intended for form fields, a pattern is repeated across all pages of the job; etc. As an example, output itself may be analyzed for form-like content (name, address, dollar amount, etc.). In contrast, a job intended for a blank page may be analyzed to be likely to consist of a single image or paragraphs of text that flow down the page.

As to a print job, it may include commands, data, etc., specified according to one or more languages. For example, consider PostScript (PS), which is a page description language utilized in various types of applications (e.g., electronic publishing, desktop publishing, etc.). It is a dynamically typed, concatenative programming language.

As an example, a printer system may include circuitry that can utilize one or more types of languages, commands, etc. For example, consider a printer system that can receive text (e.g., ASCII, etc.) as input. As an example, a printer system may utilize a font table or font tables (e.g., consider dot matrix printer systems, etc.), which may be in memory or uploaded to memory (e.g., customized glyphs, etc.). As an example, a printer system can include circuitry to receive input to print raster graphics. For example, consider graphics interpreted by a computer and sent as a series of dots to a printer system that can utilize a series of escape sequences. As an example, a printer system can include circuitry for printing vector graphics. As an example, a printer system can utilize one or more types of drivers, which may be executed locally, remotely, locally and remotely, etc.

As an example, an application can be executed to transform a document into a PostScript (PS) program that is executable by a printer system for printing of the document to a medium. For example, a PS program can be sent to an interpreter in a printer system, which results in a printed document, or to one inside another application, which can render the document to a display.

The PS approach can be used to implement on-the fly rasterization where, for example, text and/or other graphics are specified in terms of straight lines and cubic Bezier curves (e.g., akin to those utilized in CAD applications), which can allow for arbitrary scaling, rotating and other transformations. Upon execution of a PS program (e.g., interpretation of a PS program), an interpreter can convert instructions into dots to form desired output. As an example, a PostScript interpreter may be referred to as a PS raster image processor (RIP).

As to the Printer Job Language (PJL) (Hewlett-Packard), it can be utilized for switching printer languages at the job level, and for status readback between a printer system and a computing device (e.g., a host computer, etc.). PJL includes job level controls, such as printer language switching, job separation, environment, status readback, device attendance and file system commands. Another language is Printer Command Language (PCL), which tends to be supported by various printer systems that support PS. As an example, a printer system can include support for an extended PJL, which may include proprietary commands (e.g., customized commands, etc.). The PJL can be structured in an architecture where it resides above any other printer language and parses commands first. The syntax of PJL tends to uses plain English words.

As an example, an analysis may utilize a graphics application that can generate an image using a print job. For example, consider Display PostScript (or DPS), which is a 2D graphics engine system for computers which uses the PostScript (PS) imaging model and language to generate on-screen graphics. As an example, a printer system can utilize a graphics application to generate an image, such as a bitmap, a pixel image, etc., which can be analyzed with respect to graphics (e.g., text, etc.) to determine one or more characteristics (e.g., density, word length, spacing, etc.).

As to various types of application, consider an application that generates and/or stores graphics in a portable document format (e.g., PDF), that generates, stores and executes PS code, etc.

As to analysis of a print job, consider analysis that determines the presence of one or more types of characters, controls, etc. For example, consider a carriage return, a horizontal tab, a space character, white space (e.g., resulting from one or more spaces, horizontal tabs, etc.). In such an example, a printer system can analyze a print job to determine characteristics as to the print job being for a form (pre-printed form, labels, etc.). With reference to the examples in FIG. 4, consider the form 410, which includes lines for text that may be tabbed (e.g., white space separations, etc.), consider the forms 420, 430, 440 and 450, which may include commands for short and repetitive text (e.g., alphanumeric characters, etc.). As an example, text may be for an address (e.g., return, destination, etc.). As an example, text may be for a filing system (e.g., file folders to be placed in a file drawer of a filing cabinet, etc.).

As an example, a printer system may analyze a print job or print jobs to determine aspects such as printer language, which may provide an indication as to a type of print job (e.g., for a form, for paper, for photographic paper, for brochure paper, etc.). For example, consider the following example that includes two print jobs, one PCL and one PostScript. Where a printer system has a queue with multiple jobs, it may analyze the multiple jobs and make one or more types of comparisons, which may give an indication as to a proper type of medium for each of the print jobs.

Example: a PCL print job prints first, then PJL code switches the printer language to prepare for a PostScript print job.

<ESC>%-12345X@PJL <CR><LF>
@PJL COMMENT  Beginning PCL Job  <CR><LF>
@PJL ENTER LANGUAGE=PCL <CR><LF>
@PJL SET LPARM: PCL SYMSET=DESKTOP <CR><LF>
<ESC>E . . . PCL job . . . <ESC>E
~<ESC>%-12345X@PJL COMMENT End PCL <CR><LF>
@PJL COMMENT Ready for PostScript Job <CR><LF>
@PJL ENTER LANGUAGE=POSTSCRIPT <CR><LF>
%!PS-ADOBE . . . PostScript print job . . . AD
~<ESC>%-12345X As an example, a printer system may interpret a PostScript print job and format a page in memory for printing where the printer system formats a full page (e.g., a full frame). In the PJL, a variable ADOBEMBT (Adobe MBT) can be set (e.g., off, on, or auto). As an example, an analysis of a print job can utilize a full page (e.g., full frame) in memory for determining one or more aspects of a print job, where the printer system includes sufficient memory to store the full page. As an example, if there is not sufficient memory, the printer system may perform some amount of compression on the full page to get it to fit into available memory. In such an approach, printed images on may result in the loss of some detail from an original. With ADOBEMBT set to "on", a printer system can format a PostScript page in strips, which can demand lesser memory when compared to a full page approach. As an example, a printer system may analyze a print job in a strip by strip manner for indicia of the type of print job and proper medium. As an example, where ADOBEMBT is set to "auto", a printer system can select either full frame, depending on the selected page size and the amount of memory available, or ADOBEMBT "on". For example, if letter is the page size and the printer has 7 Mb of memory available, the printer will print full frame (disable ADOBEMBT); if less than 7 Mb is available, the printer will enable MBT and process the page in strips.

As an example, a printer system can track MBT switching as an indicator of type of media, for example, on a per page basis. In such an example, a printer system can analyze a print job accordingly, for example, full page or strip by strip. As an example, a print job analyzer can switch modes from a full page mode to a strip by strip mode responsive to switching MBT. In such an example, the print job analyzer can include a full page analysis mode that can determine one or more characteristics that may be indicative of a form as a proper medium or not; whereas, the print job analyzer can include a strip by strip analysis mode, which may determine that a form is a proper medium before analyzing all strips. In such an example, consider an approach that analyzes 10 percent of the strips and determines that a pre-printed form, labels, etc., is the proper medium and that the proper medium is not loaded. In such an example, the printer system can take action (e.g., issue a notification, etc.) without having to analyze the remaining 90 percent of the strips. As mentioned, resorting to strip by strip can be a result of a large print job and/or insufficient memory. Where a print job is large and the memory is also large but insufficient, that may be an indication of a high detail photograph, which may be determined with a relatively high certainty after analysis of a number of strips that is considerably less than a total number of strips.

In PJL, various types of variables can be utilized to query for size of paper in a tray. For example, consider the variables INTRAY1SIZE, INTRAY2SIZE, etc. In PJL, various types of variables can be utilized as to media types (e.g., MEDIATYPE: TRANSPARENCY, GLOSSY, SPECIAL, PAPER, PREPRINTED, LETTERHEAD, PREPUNCHED, LABELS, BOND, RECYCLED, COLOR, CARDSTOCK, HEAVY, TYPE28161, TYPE28162, and ENVELOPE). In PJL, the variable MEDIATYPE sets the default media type for a current PJL job.

As to Hewlett-Packard laserjet printer systems that utilize MEDIATYPE (8500 Series), these are configured a priori by assigning a media type to each tray. Thus, a user must configure the media type (see above MEDIATYPE) for each of the input trays. Also the user must configure the media size if the printer system is configured for cassette mode in tray 1. Only if the media type and size have been correctly configured for the input trays, will certain Hewlett-Packard laserjet printer systems print based on the type and size of media and will use those configurations to automatically use the correct input tray. Where the trays are not configured and loaded properly, the Hewlett-Packard laserjet printer systems will possibly print on the wrong media. Further, such HP laserjet printer systems will automatically adjust print speed to accommodate the configured media by making adjustments that aim to give the best quality output, saving time and resources. And, where such HP laserjet printer systems are not set properly, the printer system might not print on the correct media and/or at the correct speed for the media type, which can result in poor print quality.

In PJL, various types of codes indicate tray and media. For example, consider "foreground paper loading" messages in the form 41XYY where X=Tray Code and YY=Media Code. Media codes include 00 for unknown paper, 01 for unknown envelope, 02 for letter paper, 03 for legal paper, . . . , 15 for custom media paper, etc. As an example, a foreground paper loading message can be sent when one of the paper input sources is out of paper and there is no other input source available and loaded with the correct paper size.

As an example, a customized message can be generated utilizing one or more types of inspection circuitry where, for example, a message is generated when a paper size may be proper but the printer system has determined that the type of paper of that size is not proper. For example, consider a message that includes a format to indicate that size is proper but that the type of paper is not proper where a code indicates a type of mismatch (e.g., 12 is "1" plain paper desired and "2" printed form loaded; 21 is printed form desired and plain paper loaded; 13 is plain paper desired and "3" peel-off labels loaded; 31 is peel-off desired and plain paper loaded; etc.). Such a code can include a numeric value for what is desired and a numeric value (or values) for what is loaded, including, for example, what tray, etc.

As to paper jam messages, they can be of the form 42XYY, where X is the number of jammed pages and YY is the location of the jam; further, a Y value (e.g., 01 to 15) can be provided for such messages, for example, 42203 indicates that 2 pages are jammed in the fuser output of a laserjet printer system.

As an example, in a networked environment, a system can involve routing jobs for printing to one or more printer systems of a network that includes printer systems. As an example, output can be routed to the printer system with the appropriate medium (e.g., general, photographic, forms, labels, etc.).

As an example, a printer system can generate a pixel image of a print job (or other type of machine representation suitable for analysis). As an example, a printer system can analyze a generated pixel image for one or more of text density, word size, spacing of lines, word type, numbers, etc. As an example, a printer system can compare results of an analysis of a pixel image to one or more of one or more prior jobs, one or more known forms, etc., including possibly stored pixel images of known forms as in a forms database. As an example, a printer system can match a pixel image of a print job to a stored pixel image of a form. As an example, a printer system can generate a composite pixel image of a print job and a stored pixel image of a form.

As an example, a printer system can use a camera and/or other circuitry to see if the medium loaded matches/is indicative of a form/known form. As an example, a printer system can overlay a pixel image of a print job to a camera image of a form that is loaded. As an example, a printer system can transmit a pixel image of a composite print job/form to a user and wait for a confirmation.

As an example, a printer system can include an application programming interface (API) that can be utilized to perform one or more analyzes, take one or more actions responsive to an analysis, etc. For example, consider an API that can receive a print job and/or a portion thereof for analysis with respect to a loaded medium (e.g., a next page in a tray, etc.), consider an API that can receive a print job and/or a portion thereof for analysis with respect to one or more known forms as in a database (e.g., remote or local to the printer system), etc.

As an example, an API may be utilized in a manner that is invisible to a user, unless an action results therefrom, such as a notification, etc. As mentioned, where a strip by strip approach is utilized, an API and/or other circuitry of a printer system, may analyze individual strips and/or a number of strips that is less than a total number to make one or more determinations. As an example, an API can include a call that generates a low resolution image of a portion of a print job for analysis to compare the analysis with one or more loaded media (e.g., as in one or more trays of a printer system). As an example, an API may be utilized in an iterative manner, for example, in a loop in a printer system upon execution of a multi-page print job, where if the API call is made once at the beginning the printer system will continually check each page (e.g., loaded media, etc.) and issue a response if a problem arises beyond the first page.

As mentioned, FIG. 4 shows some examples of types of media, which include a form 410, and labels 420, 430, 440 and 450. As shown, the form 410 includes a combination of check boxes, name and birthdate information fields. As an example, inspection circuitry of a printer system can capture an image of the form 410 in a tray (e.g., a source) and determine that it is not a blank sheet. The printer system can then analyze a print job for one or more indicators that the print job is likely to be for the form. Where the printer system determines that the form and the print job are a likely match, the printer system can execute printing on the form. In contrast, where the print job analysis indicates that the print job is not likely to be for the form, the printer system can issue one or more notifications and/or search for a printer system on a network that indicates that it has the appropriate medium (e.g., or one of multiple acceptable media) for the print job. In such an example, the form is not wasted by having the printer system executing printing of a print job that is not matched to that form. While a user may experience some inconvenience by adjusting media in a source, using a different printer system, etc., the user does not have to endure going to the printer system to see that the print job was printed on a form, which is an unpleasant surprise and a waste of the form and the user's time.

As an example, inspection circuitry can be utilized to identify one or more types of the media. For example, at a coarse level, a printer system may identify a sheet as being a form. At a next level, it may identify the form as being a label or labels. For example, a medium may be identified as being a label or labels via one or more measurements as made via one or more type of inspection circuitry. For example, the scale circuitry 304 may determine a mass (e.g., or weight), the dimension circuitry 308 may determine one or more dimensions (e.g., boundaries as to a single label, multiple labels, etc.), the reflectance/absorption circuitry 312 may determine a surface characteristic (e.g., of a top surface, a side surface, a bottom surface, etc.), the camera circuitry 316 may determine one or more characteristics (e.g., via image recognition, edge recognition, etc.), the durometer circuitry 320 may determine one or more characteristics (e.g., sliding of a surface due to application of force as to a peel of label sliding against a support surface, etc.), the wetting circuitry 324 may determine one or more characteristics (e.g., non-wetting, such as hydrophobicity as for a package that may experience moisture such as rain during transport or while sitting outside, etc.), etc.

As an example, a camera can output pixel values that can be analyzed using one or more techniques such as image recognition, image analysis, etc. For example, consider a vector of pixel values where the vector corresponds to a line scan of a medium. In such an example, the line scan can be analyzed for varying values of the pixels. Consider a string of pixel values where the pixel values are at a particular resolution which may be pixels per inch, pixels per centimeter, etc. As an example, a label can include a boundary between the label and the label backing sheet. In such an example, the boundary can be approximately 0.25 mm in width. Thus, for a 210 mm by 297 mm (A4) label backing sheet, a line scan may be at a resolution of approximately 0.5 mm or less per pixel, for example, consider a vector with over 400 pixel values that can be analyzed to determine if a boundary or boundaries exist (e.g., a gradient in adjacent pixel values).

As an example, a camera may be specified according to a pixel density such as 96 dpi, meaning that there are 96 pixels per inch. As 1 inch is equal to 25.4 mm, there are 96 pixels per 25.4 mm such that there are approximately 0.265 mm in a pixel. As an example, where a boundary of a label on a label sheet is smaller than 0.26 mm, a pixel density greater than 96 dpi may be utilized.

As an example, a camera may be utilized to detect a form such as a pre-printed form (see, e.g., FIG. 4 and the form 410). In such an example, a line on a form may be of a width that is of the order of several millimeters to approximately 0.1 mm. In such an example, the camera may include a resolution or pixel density that is sufficient to detect a line of a width of 0.1 mm. For example, consider 2.65 times 96 dpi or approximately 254.4 dpi as a pixel density (e.g., 254.4 pixels per 25.4 mm). As an example, a line of pixels may be widthwise, lengthwise or at a diagonal angle with respect to a medium loaded in a printer system.

As an example, a non-orthogonal angle may be utilized for analysis to determine a number of items such as a number of form fields, a number of labels, etc. For example, consider the examples of FIG. 4 where a line across the labels 420 can detect at least three of the four labels or at least two labels vertically and at least two labels horizontally. Such an approach may be utilized to distinguish the labels 420 from the labels 430, 440 and 450. In such an example, a printer system may determine (a) that a label sheet is a topmost sheet of a stack of sheets and (b) that the label sheet includes a number of labels that can be a specific number or a number in a range (e.g., from a minimum estimated number to a maximum estimated number). As an example, where information in a print job is analyzed, a printer system may determine whether the label sheet is suitable for that print job. For example, consider a print job for the labels 420 where the printer system is loaded with the labels 450 (e.g., or vice versa).

As an example, the ID circuitry 336 may be utilized to determine a type of medium, which may be a blank sheet of paper, an envelope, a form, a label, etc. In such an example, the medium can include one or more types of codes, which can be determined via the ID circuitry 336.

Figure 5:
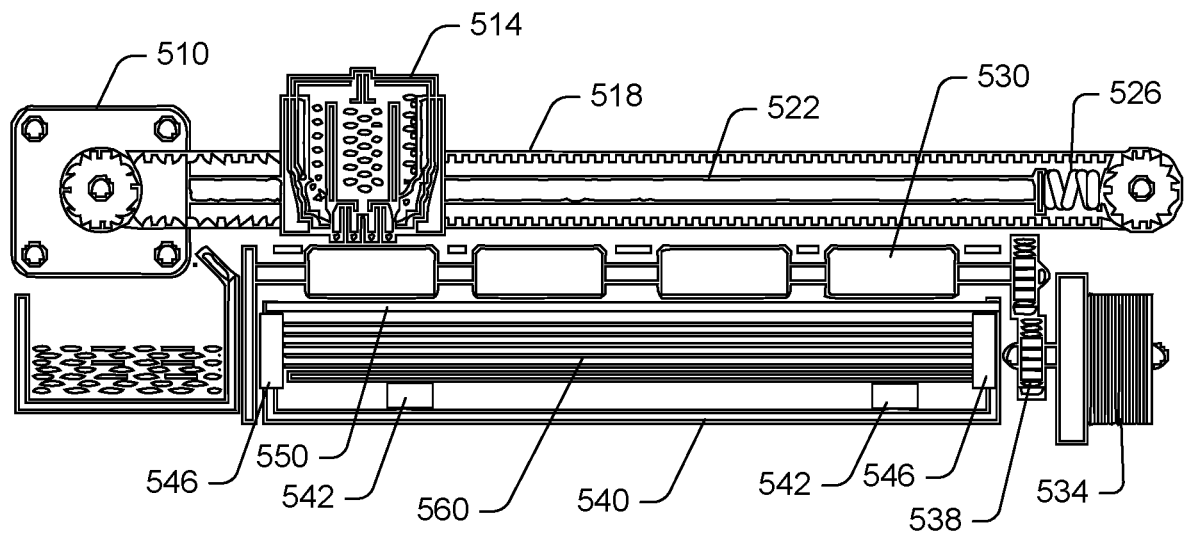
FIG. 5 is a diagram of an example of a printer system assembly.

FIG. 5 shows an example of a printer system assembly 500 that includes a carriage motor 510, one or more cartridges 514, a belt 518, a carriage rail 522, a tensioner 526, a platen 530, a line feed motor 534, gears 538, a tray 540, spring supports 542, guides 546, and a cover member 550. As shown, sheets 560 of one or more types of media are positioned (e.g., loaded) in the tray 540.

In the example of FIG. 5, the line feed motor 534 can be controlled to rotate the platen 530 (e.g., directly and/or via one or more of the gears 538, etc.), where the platen 530 can include rollers that support a medium whereby one or more of the one or more cartridges 514 are translated across the carriage rail 522 as driven by the carriage motor 510 via the belt 518, which can be tensioned via the tensioner 526, to direct one or more substances onto the medium.

In the example of FIG. 5, inspection circuitry such as one or more of the inspection circuitries 300 of FIG. 5 may be included in the printer system assembly 500. For example, consider the tray 540, the spring supports 542, the guides 546, and the cover member 550, as including one or more types of inspection circuitry. As an example, the platen 530, the line feed motor 534, the gears 538 and/or one or more axles thereof, the carriage motor 510, the one or more cartridges 514, the belt 518, the carriage rail 522, the tensioner 526, etc., may include one or more types of inspection circuitry. As to the spring supports 542, consider one or more load cells. As to the guides 546, consider one or more dimension measurement circuits. As to the cover member 550, consider one or more cameras, one or more ID readers, one or more reflectance and/or absorption emitters and/or sensors, etc.

As an example, inspection circuitry can be operatively coupled to a processor that can control one or more motors, one or more rollers, etc., such that a "test" may be performed and/or such that a medium may be handled in a manner that depends on results of one or more measurements. For example, for a print job to be printed using plain, blank printer paper, where a label sheet or form sheet is present as a top sheet of a stack, that condition may be detected and cause an infeed mechanism to transport that sheet without printing and to detect whether the next sheet in the stack is suitable for printing the print job. If that next sheet is suitable, the printer system may utilize that sheet for executing the print job.

In the example of FIG. 5, the medium may be subjected to some amount of tension and/or compression via operation of one or more components. For example, multiple sets of rollers can provide for grasping and/or clamping the medium whereby strain may be measured via sensors (e.g., inspection circuitry) that can determine force (e.g., torque) on a roller or rollers. For example, consider a mechanism that holds one roller rotationally fixed while another roller rotates clockwise and/or counter-clockwise. In such an example, one or more physical properties of the medium may be determined. In such an example, one or more of motors (e.g., consider the line feed motor 534) may be controlled in a manner to acquire measurement. As an example, a set of rollers can include an upper roller and a lower roller where a clamping force can be applied, for example, via moving the upper roller and/or the lower roller to diminish a gap through which a medium can be transported from the tray 540. In such an example, another set of rollers (e.g., upper and lower) can also adjust a gap. In such an example, a medium that is "clamped" by the two sets of rollers can be subjected to one or more of compression and tension where movement and/or force (e.g., torque) may be measured about one or more rotational axes of the two sets of rollers to determine one or more physical characteristics of the medium. In such an example, the gap may be adjustable, for example, to determine frictional force with respect to the medium, clamping force required to fix the medium, etc. For example, as to frictional force, it may indicate that the medium includes a "slick" surface that has a low coefficient of friction.

As explained, a printer system can include inspection circuitry for measurement of one or more types of friction, where friction may be defined as the resisting force that arises when a surface of one substance slides, or tends to slide, over an adjoining surface of itself or another substance. Between surfaces of solids in contact there are two kinds of friction: (1) the resistance opposing the force required to start to move one surface over another, and (2) the resistance opposing the force required to continue moving one surface over another at a constant speed. As to coefficient of friction (COF), it may be determined as a ratio of the frictional force resisting movement of the surface being tested to the force applied (e.g., normal force, etc.) to that surface (the weight of the material above that surface). As to the coefficient of static or starting friction, it may be determined as a ratio of the force resisting initial motion of the surfaces, to the applied force (e.g., normal force, etc.). As to the coefficient of kinetic or sliding friction, it may be determined as a ratio of the force required to sustain the uniform relative movement of the surfaces, to the applied force (e.g., normal force, etc.).

As an example, a printer system can include one or more types of inspection circuitry that can measure one or more frictional characteristics with respect to medium-to-medium contact. For example, the coefficient of friction of printing media can be an indicator of the ease with which a sheet in a stack of media will slide across one or more neighboring sheets (e.g., above and/or below). The COF can be a factor for operation of a printer system such as during operations that occur on the infeed of a printer system (e.g., medium transport). As an example, media that can be stacked, may be characterized by a COF that helps to prevent so-called "double-feeding", which is a type of multiple feeding whereby as a mechanism attempts to infeed a single sheet, multiple sheets are inappropriately fed. As mentioned, inspection circuitry can include ambient condition circuitry such as for temperature and humidity. In such an example, temperature and/or humidity may be utilized in combination with one or more friction measurements to determine one or more characteristics of a medium and/or media.

As an example, where a roller, a set of rollers or sets of rollers infeed a sheet that is a sheet of a stack, there may be an expected friction measure or expected friction measures where the stack is of the same type of media. However, where a sheet in the stack differs from one or more other neighboring sheets in the stack, one or more friction measures may differ from one or more expected friction measures. For example, where a stack of blank printer paper is loaded and a sheet transported from the top of the stack, it will contact and slide against the neighboring sheet in a predictable manner (e.g., as may be compensated by temperature and/or humidity, which may be specific to the type of medium). Such a medium may have a COF of X; whereas, if the sheet transported differs from the neighboring sheet, the COF may be Y. As an example, a printer system can include memory, local and/or remote, with values, which may be expected values and/or combination values (e.g., of different types of media in contact). In such an example, one or more comparisons may be made to determine a type of medium that is being transported and/or a type of medium that is neighboring (e.g., in contact) with that medium as a sheet in a stack. For example, where two adjacent sheets are a label sheet and a blank sheet of printer paper, the COF can differ from the scenario where the two adjacent sheets are both label sheets or both blank sheets of paper. Further, for a label sheet, the COF may differ for the top side and the bottom side with respect to another type of sheet. For example, a top side may be less slick than a bottom side. Where such a label sheet is adjacent to a blank sheet of paper, the COF can depend on whether the label sheet bottom is adjacent to the blank sheet of paper (e.g., the label sheet is being transported) or whether the label sheet top is adjacent to the blank sheet of paper (e.g., the blank sheet of paper is being transported).

Figure 6:
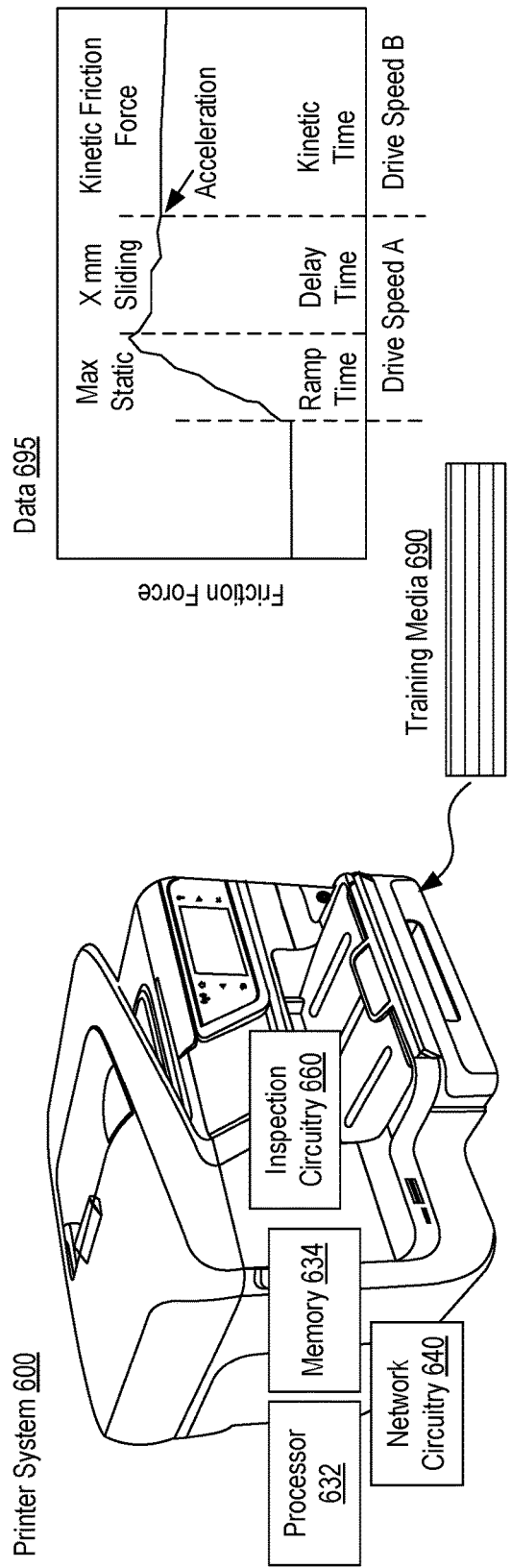
FIG. 6 is a diagram of an example of a system, an example of a table that includes coefficient of friction values, an example of training media and an example plot of temporal data.

FIG. 6 shows an example of a printer system 600 that includes one or more processors 632, memory 634 accessible to at least one of the one or more processors 632, network circuitry 640 and inspection circuitry 660. FIG. 6 also shows an example table 610 that includes grand mean values for COF for different types of media for both static COF and kinetic COF. As shown, the grand mean values in mN differ for the different types of media. In the table 610, repeatability and reproducibility are estimates of the maximum difference (at 95 percent), which may be expected when comparing test results for materials same and/or similar to those listed under similar test conditions. Values as in a table such as the table 610 may be stored in a printer system and/or be accessible to a printer system to make one or more determinations as to media. As an example, a printer system (e.g., the printer system 600, etc.) can include inspection circuitry (e.g., the inspection circuitry 660) that can generate values such as one or more types of values for one or more different types of media (e.g., as in the table 610, etc.).

As an example, the printer system 600 can be loaded with training media 690, which can be heterogeneous in that it includes at least some adjacent sheets that differ (see, e.g., material in the table 610, etc.). As an example, the stack order of the sheets can be known for the training media 690 (e.g., a training ream, etc.) such that the sheets can be processed as known samples. As an example, the known samples may have known properties such as, for example, friction properties. In the example of FIG. 6, the printer system 600 can process the training media 690 for one or more purposes such as, for example, to determine properties (e.g., to be stored, train a machine model, etc.), to calibrate the printer system 600 with respect to determined and/or known properties, etc.

As an example, the training media 690 may be a stack of sheets that includes orientation differences. For example, a sheet of a medium can include fibers that are oriented in a particular direction such that orientation of sheets of the same medium can make a difference in friction and/or such that orientation of a sheet of a medium with respect to another sheet of a different medium can make a difference in friction. For example, consider a sheet of paper with fibers oriented at an angle such that rotation of the sheet by 180 degrees with respect to another sheet in a stack will make a difference in friction. As an example, where a form is to be printed upon, there may be a measurable difference in friction when the form is in the proper orientation and when the form is rotated 180 degrees and hence not in the proper orientation (e.g., spun about an axis normal to the face of the form). As an example, a printer system may determine that a form is not oriented properly using one or more friction measurements.

As an example, the inspection circuitry 660 can include one or more sensors that can measure friction force with respect to time where, for example, the inspection circuitry 660 can include and/or be operatively coupled to circuitry that can move a sheet with respect to another sheet (e.g., an adjacent sheet) at one or more drive speeds. For example, consider the data 695 of the friction force versus time plot where a first drive speed (Drive Speed A) is utilized followed by a second drive speed (Drive Speed B). In such an example, the second drive speed can exceed the first drive speed. As shown by the data 695, a maximum static frictional force (e.g., static friction force) can be determined where thereafter some sliding occurs (e.g., X mm) followed by a kinetic period that characterizes kinetic frictional force (e.g., kinetic friction force).

A TAPPI standard T 549 is incorporated by reference herein, which is set forth in a document entitled "Coefficients of static and kinetic friction of uncoated writing and printing paper by use of the horizontal plane method (Reaffirmation of T 549 om-08)", 30 Apr. 2013. An article by Johansson et al., entitled "Paper Friction-Influence of Measurement Conditions", TAPPI Journal, Vol. 81, No. 5, May 1998, pp. 175-183, is incorporated by reference herein.

As an example, a printer system can include one or more mechanical components that can move one sheet with respect to another adjacent sheet. For example, consider a sled that includes a rubberized surface that can be in contact with one surface of a sheet while the other surface of the sheet is in contact with an adjacent sheet. In such an example, the sled can apply a normal force to the sheet where the normal force can be in a direction of gravity. As an example, a motorized wire and pulley system can be utilized to position the sled and/or to drive the sled. As an example, a motor can be controlled at one or more speeds where force can be measured via a load cell, a specialized motor, motor circuitry, etc., to determine friction force. As an example, an electric motor can provide for measurable torque such as, for example, measurable holding torque, which is a measurement of how much rotating force is required to force a stationary stepper motor shaft out of position. Holding torque (T) may be calculated as the product of a motor torque constant (KT) and current (i) applied to the stator windings, for example, as follows: T=KTi. As an example, a slope of a torque-current curve can be an estimate of a motor torque constant; noting that a no-load current can be greater than zero as it can take a certain amount of current to overcome internal friction of a motor. As an example, a friction measurement can include an internal friction measurement and a measurement of a combined friction such as internal friction plus friction to move a sheet with respect to an adjacent sheet. As an example, where a motor shaft is operatively coupled to a sheet in a stack (e.g., via a sled, roller, rollers, etc.), one or more torques may be determined as a force to move the motor shaft, which may be related to one or more friction forces to move the sheet with respect to an adjacent sheet in the stack. As an example, one or more sensors may determine a strain of a sheet, for example, consider a sheet that is moved by rollers where a sled (e.g., or sleds) are positioned on the sheet to apply a normal force where the sheet is in contact with an adjacent sheet. In such an example, a sheet may stretch prior to movement of the sheet underneath the sled. As an example, one or more torques, rotational movements of a shaft or shafts, etc., may be measured to determine an amount of strain and/or an amount of frictional force (or frictional forces). As an example, a sled may be placed at a proximate end of a sheet to lessen an amount of material of the sheet (e.g., a portion of a length) that may strain or a sled may be placed at a distal end of a sheet to increase an amount of material of the sheet (e.g., an increased portion of the length) that may strain.

As an example, a printer system may include a tensile type of tester with a vertical element (e.g., a moving element with a load cell that moves in a direction with a vertical component) or a horizontal type of tester (e.g., moving element with load cell that moves horizontal). As an example, a sheet may move via movement of a sled and/or may move via a mechanism that "pulls" the sheet as subjected to mass of the sled. For example, consider rollers that grip the sheet and can determine an amount of force applied to move the sheet, as subjected to the mass of the sled, as in contact with an adjacent sheet. In such an example, consider a motor that increases gradually in force (torque) applied to a roller or rollers where the force can be noted as to when the sheet moves (e.g., to determine a static friction force). As an example, the mass of a sled (e.g., or sleds) may be in a range from 1 gram to 500 grams or more. As mentioned, a sled (e.g., or sleds) may include a surface that can reliably stick with a sheet of media. For example, such a surface can have a friction coefficient with respect to a sheet of media that is greater than the friction coefficient between two adjacent sheets of media (e.g., same media, different media, etc.).

As an example, a printer system can include circuitry that can measure friction force during feeding of a sheet of medium. For example, a printer system can include a sled that applies a normal force to a stack of sheets where upon feeding each sheet a friction force is determined (e.g., via a load cell, motor drive circuitry, etc.). As an example, a sled can be a positionable sled. For example, consider a sled that is positioned, that moves during a friction test (e.g., which may be a feed), and that is repositioned properly onto a next sheet (e.g., lifted, positioned and dropped). As an example, a printer system can include a test mode and a non-test mode where, for example, the sled (e.g., or sleds) are in a storage state, which may reduce demands on a printer system (e.g., where friction force measurements are not needed, desired, etc.).

As an example, a printer system may measure and store values for friction (e.g., COF, etc.) and may calculate statistics, formulate a model, etc., that can be utilized to characterize one or more types of media as in a stack. For example, where a printer system consistently draws sheets from a stack with a friction value within a threshold (e.g., +/− standard deviation or a multiple thereof (e.g., 1.5×STD, 2×STD, etc.)), the printer system may determine that the sheets are of the same type of medium. In such an example, where a sensor-based friction measurement (e.g., or measurements) results in a value that is outside of the threshold, the printer system may determine that a change has occurred in a stack such that the value corresponds to a medium that is different from prior sheets taken from the stack. As an example, a printer system may determine and/or otherwise be informed that a stack is a particular medium. In such an example, the printer system can associate measurements with that type of medium and store such information locally and/or remotely, for example, for future access. In such an example, the printer system may "know" that printer paper sheets Z have an average value of X with a standard deviation of Y and may "know" that label sheets A have an average value of B with a standard deviation C. Further, the printer system may determine that where a printer paper sheet Z is adjacent to a label sheet A, that two different values may result depending on which sheet is on top or on bottom (e.g., depending on the type of feed mechanism). In such an example, the printer system may determine how the stack loaded therein is composed and may issue a signal in response where an issue exists due to the stack being composed in a manner that is not appropriate for a print job or print jobs.

As an example, a printer system may be a "smart" printer system that utilized one or more machine learning (e.g., artificial intelligence) techniques to determine what type of medium or media are loaded therein. A smart printer system may utilize one or more types of inspection circuitry to provide measurements where such measurements may be repeated numerous times responsive to processing stacks of sheets for numerous print jobs. For example, consider a printer system that processes a box of 10 reams of 20 lb sheets of paper with 500 sheets per ream. Such a printer system would collect approximately 5,000 measurements or sets of measurements, which can provide for training (e.g., learning, statistics, etc.). In such an example, a portion of the sheets may be utilized for testing, which may further hone weights of a machine learning model. As an example, 5,000 sheets may be available at a cost of approximately $60, which may be sacrificed for purposes of training a machine learning model of a printer system such that the printer system can utilize the trained machine model to make determinations down the road as to one or more types of media loaded in the printer system. As an example, a machine learning model may be trained using data from a plurality of printer systems where the trained machine learning model may be distributed to individual printer systems for use.

As an example, a specialized stack of medium may be utilized for training a machine learning model of a printer system and/or for building a database (e.g., look-up-table, etc.) in a printer system. For example, consider a training stack with three or more types of media where each is included in different portions of the training stack and optionally in instances of combinations (e.g., XYXZYX, etc.) to understand how one or more measurements may vary depending on the type of media and/or stacking order. As an example, a training stack can include printer paper, glossy photograph quality paper, pre-printed forms and labels. Such a training stack may include more than 10 sheets, more than 20 sheets, more than 30 sheets, etc. As an example, consider a training stack with 100 sheets or more. As an example, a training stack may be loaded and processed by a printer system periodically such that the printer system is up-to-date with respect to wear of components, changes in media, etc. As an example, a method can include processing a training stack to train a printer system and then operating the printer system in a manner that can determine that a match does not exist between a print job to be printed on a transportable medium and a characterized transportable medium loaded in the printer system. In such an example, the characterized transportable medium can be characterized at least in part via one or more trained models (e.g., functions, neural networks, vector machines, look-up-tables, databases, etc.).

As an example, a printer system can include machine learning to generate a trained machine model that can be utilized with respect to forms. For example, a printer system can include one or more types of sensors that can inspect media where the media may be matched to one or more aspects of a print job. For example, consider a print job being sent only once, which may indicate that a match existed between the print job and a loaded medium. In contrast, where a print job prints on an incorrect medium, the print job may be resent after a delay, which may be a delay that involves loading a proper medium. In such an example, the printer system can include circuitry to detect an action taken with respect to a tray (e.g., pullout tray, feeder, etc.) and retransmission of a print job. As to determining whether a print job is the same, an analysis may indicate that the print job is the same (resent), while it may have a new ID. For example, an analysis that determines a same size, same information as to commands, the same source, etc. As an example, a printer system can include a machine learning model that can be trained using such information as to actions being taken at the printer system whereby a trained machine model can determine whether a print job and loaded media match (or not).

As an example, a machine model can be a neural network, which may include multiple inputs and one or more outputs.

In such an example, the machine model may be a machine learning model that can be trained using experiences from one or more printer systems as to media and/or print jobs. As an example, training may be centralized and/or distributed. For example, training may be particular to a particular printer system and/or training may be general as to a number of different printer systems (e.g., in a network, standalone, etc.).

Figure 7:
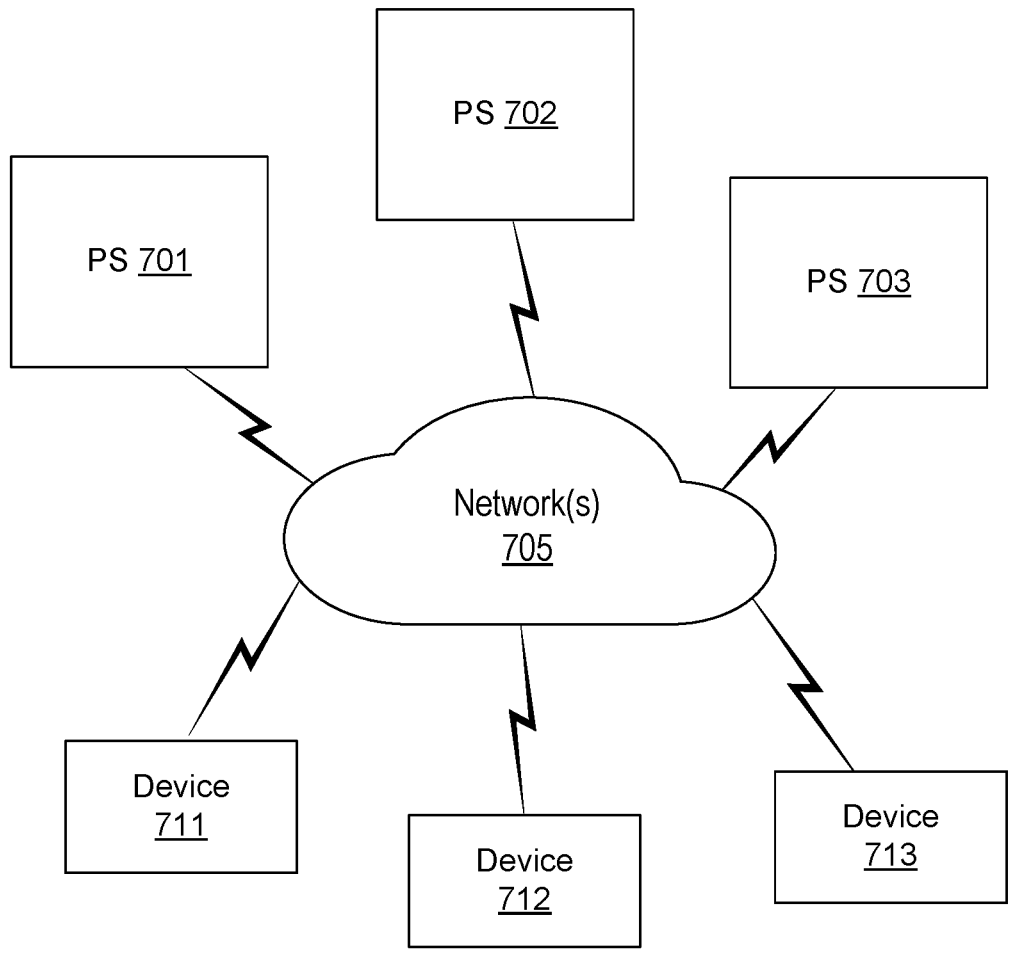
FIG. 7 is a diagram of an example of a system.

FIG. 7 shows an example of a system 700 that includes a plurality of printer systems 701, 702 and 703, one or more networks 705 (e.g., wired and/or wireless) and a plurality of devices 711, 712 and 713 where each of the devices 711, 712 and 713 may generate a print job for execution by one or more of the printer systems 701, 702 and 703, which may be communicated via at least one of the one or more networks 705.

As an example, a print job can be a file or set of files that specify what is to be printed. As an example, a print job may be identified by a unique number, and may be assigned to a particular destination, such as an address of a printer system on a network. As an example, a print job may include one or more options specified such as medium/media size, number of copies, priority, etc. As an example, print jobs may be transmitted to a print server, for example, prior to being directed to a printing destination (e.g., a particular printer system or printer systems). As an example, a printer system may include local storage that can be utilized to process and queue print jobs prior to executing one or more of the print jobs. As an example, a printer system may include circuitry that can determine that a print job is not suitable for local printing and that communicates the print job to a print server, to the device that generated the print job, to another printer system, etc., in an effort to cause proper execution of the print job.

In the example of FIG. 7, the device 711 may communicate a print job to the printer system 702 via the one or more networks 705. In response, the printer system 702 can determine whether a medium loaded for printing is appropriate for the print job. Where the medium loaded is not appropriate, the printer system 702 may take one or more actions such as issuing one or more signals, which may be local to cause action by the printer system 702 and/or which may be to one or more remote devices, systems, etc. For example, a signal may be a notification to the device 711 to send the print job elsewhere, which may come with a recommendation such as "printer system 702 has the proper medium loaded". As to a local action, consider a signal that instructions the printer system 701 to purge the loaded medium and to utilize a loaded medium that is next in line (e.g., a subsequent member of a stack). As an example, where a print server is utilized, the signal may be directed to the print server to take one or more actions, such as re-routing the print job and, for example, sending a notification to the device 711 such as "your print job has been re-routed to the printer system 703 in room XYZ". In such an example, the notification may include a reason for the re-routing (e.g., "media at printer system 701 is not appropriate for your print job").

Figure 8:
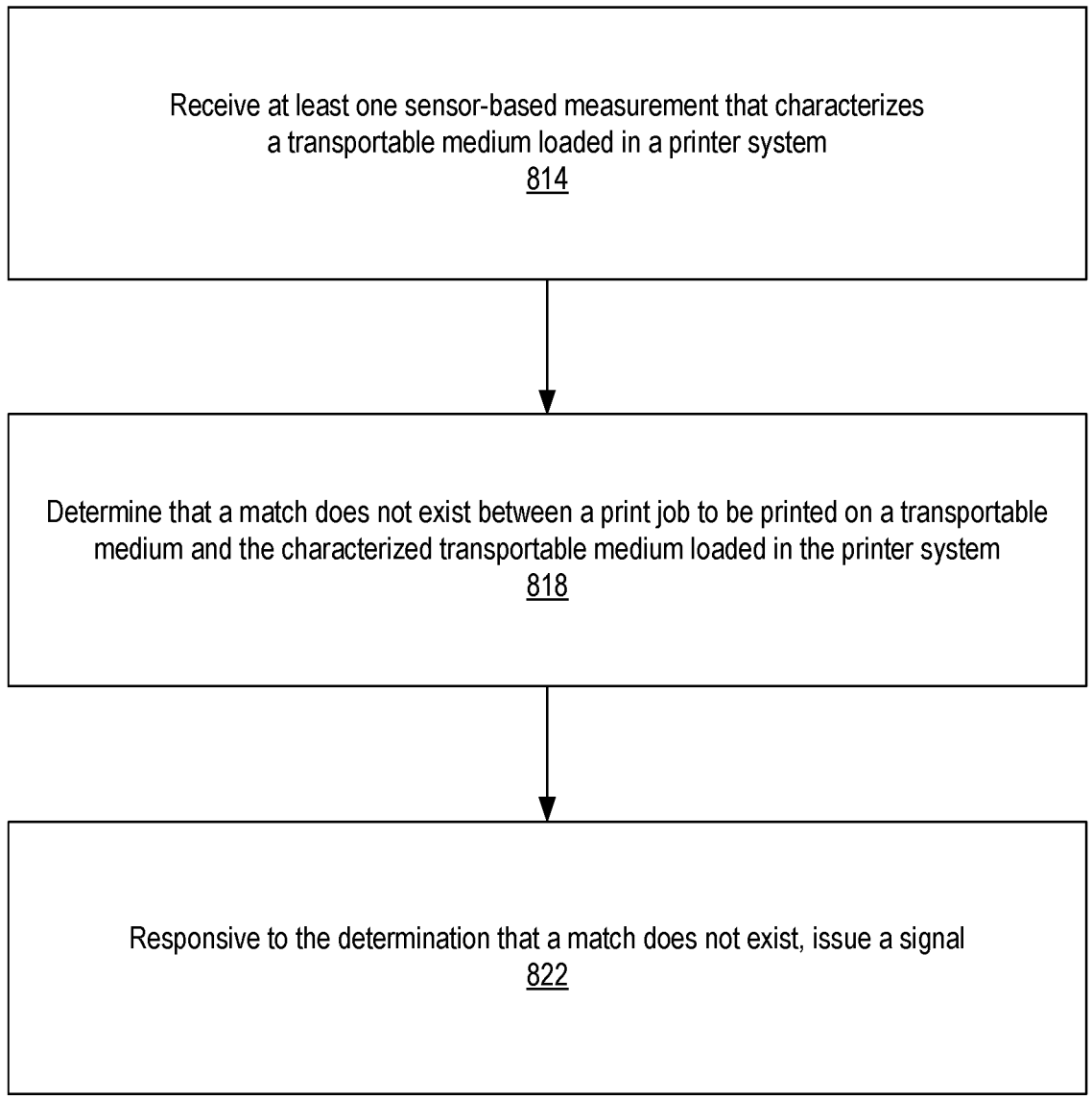
FIG. 8 is a diagram of an example of a method.

FIG. 8 shows an example of a method 810 that includes a reception block 814 for receiving at least one sensor-based measurement that characterizes a transportable medium loaded in a printer system, a determination block 818 for determining that a match does not exist between a print job to be printed on a transportable medium and the characterized transportable medium loaded in the printer system, and an issuance block 822 for, responsive to the determination that a match does not exist, issuing a signal. In such a method, the transportable medium loaded in the printer system is transportable along one or more paths of the printer system. As an example, a transport mechanism or transport mechanisms can include one or more rollers, one or more electrical motors, etc., that can move a medium such as a sheet of material, a sheet of materials, an envelope, etc., through at least a portion of the printer system.

As an example, a method can include receiving at least one sensor-based measurement that characterizes a transportable medium loaded in a printer system; determining that a match does not exist between a print job to be printed on a transportable medium and the characterized transportable medium loaded in the printer system; and responsive to the determining that the match does not exist, issuing a signal. In such an example, the issuing the signal can include transmitting a notification to a device that generated the print job (e.g., a computer operatively coupled to the printer system via a wired network, a wireless network, etc.).

As an example, a method can include issuing a signal to a printer system to purge a characterized transportable medium loaded in the printer system via a transport path of the printer system and to receive at least one sensor-based measurement that characterizes another transportable medium loaded in the printer system. In such an example, consider the media being in a stack as may be present in a tray of the printer system. For example, the purged characterized transportable medium may be in a stack that includes one or more other transportable media, which may be the same, different, etc.

As an example, a method can include issuing a signal that is for transmitting a print job to another printer system. For example, consider transmitting responsive to determining that a match exists between the print job and a characterized transportable medium loaded in the other printer system.

As an example, a printer system can include circuitry for acquiring a non-destructive sensor-based measurement and circuitry for acquiring a destructive sensor-based measurement. In such an example, a method can include selecting the circuitry for acquiring the non-destructive sensor-based measurement and acquiring a non-destructive sensor-based measurement and, for example, receiving at least one sensor-based measurement that includes receiving the acquired non-destructive sensor-based measurement. As an example, a printer system may select a non-destructive sensor-based operational mode for processing print jobs that are directed to the printer system and may select a destructive sensor-based operational mode for purposes of calibration, learning, training, etc. (e.g., where media characterized may not be intended for print job but, rather, intended to improve a printer system's ability to characterize media).

As an example, a method can include characterizing a transportable medium to be a pre-printed form where, for example, a print job is to be printed on a blank sheet of paper. In such an example, a match does not exist (e.g., a mismatch exists).

As an example, a method can include characterizing a transportable medium to be a blank sheet of paper where, for example, a print job is to be printed on a pre-printed form. In such an example, a match does not exist (e.g., a mismatch exists).

As to another example of a mismatch, consider a characterized transportable medium to be a sheet of labels where a print job is to be printed on a blank sheet of paper. Various types of mismatches may be determined to exist (e.g., lack of a match).

As an example, a printer system can include one or more sensors, which may include a camera such that a sensor-based measurement is a camera-based measurement.

As an example, a printer system can include one or more sensors, which may include one or more sensors that can acquire measurements germane to friction such that a sensor-based measurement is a friction measurement. In such an example, the friction measurement can correspond to friction between a transportable medium as a sheet of a stack of sheets loaded in the printer system and another, adjacent sheet in the stack of sheets loaded in the printer system. In such an example, the sheets may be the same or different. As an example, a printer system can include data, a model, etc., stored in memory that can be utilized to analyze a transportable medium that can be printed on, which may include analyzing the transportable medium with respect to an adjacent transportable medium (e.g., as sheets in a stack, etc.).

As an example, a method can include analyzing a print job and determining that a match does not exist based at least in part on the analyzing (e.g., determining that a mismatch exists). In such an example, analyzing can include determining that the print job includes a plurality of discrete character strings that are distributed spatially indicative of form fields. As an example, analyzing can include, where a print job is a multiple page print job, determining that two or more pages of the multiple page print job include a plurality of discrete character strings that are distributed spatially indicative of form fields (e.g., for a multipage form, etc.).

As an example, a method can include analyzing that includes determining that a print job includes a plurality of discrete character strings where each of the discrete character strings is less than a predefined number of characters and where a space is a character. In such an example, the characters can be ASCII characters and, for example, the predefined number of characters can be less than approximately 30 characters. For example, the string Jane Doe can be a nine character string; the string "North Carolina" can be a fourteen character string; etc. As an example, a print job for a form can be determined based on a character string analysis or analyses.

As an example, a method can include analyzing a print job where the analyzing includes identifying pronouns in the print job and, based at least in part on the identifying, determining that the print job is for a form. For example, consider pronouns such as names of people, places (e.g., cities, states, countries, etc.).

As an example, a method can include analyzing a print job where the analyzing includes determining a memory size of the print job. In such an example, a memory size per page may be determined where the print job is a multipage print job and/or an average memory size. Such metrics may be indicative of one or more photographs being included in the print job, which may be indicative of the print job being intended to be printed on a relatively high quality paper (e.g., glossy, brochure, etc.), rather than a stock, lower quality copy paper.

As an example, a method can include, prior to receiving at least one sensor-based measurement that characterizes a transportable medium loaded in a printer system, processing a training stack of sheets of one or more types of transportable media to train the printer system to characterize the one or more types of transportable media using one or more types of sensor-based measurements.

As an example, a printer system can include a processor; memory accessible to the processor; at least one sensor operatively coupled to the processor; and instructions stored in the memory executable to instruct the printer system to: receive at least one sensor-based measurement from at least one of the at least one sensor to characterize a transportable medium loaded in the printer system; determine that a match does not exist between a print job to be printed on a transportable medium and the characterized transportable medium loaded in the printer system; and, responsive to the determination that the match does not exist, issue a signal.

As an example, one or more computer-readable media can include processor-executable instructions that are executable to instruct a system to: receive at least one sensor-based measurement that characterizes a transportable medium loaded in a printer system; determine that a match does not exist between a print job to be printed on a transportable medium and the characterized transportable medium loaded in the printer system; and responsive to the determination that the match does not exist, issue a signal.

As described herein, various acts, steps, etc., may be implemented as instructions stored in one or more computer-readable storage media where a computer-readable storage medium is not a signal. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. The term "circuitry" includes various levels of available integration, e.g., from discrete logic circuits to the highest level of circuit integration such as VLSI, and includes programmable logic components programmed to perform the functions of an embodiment as well as special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 9:
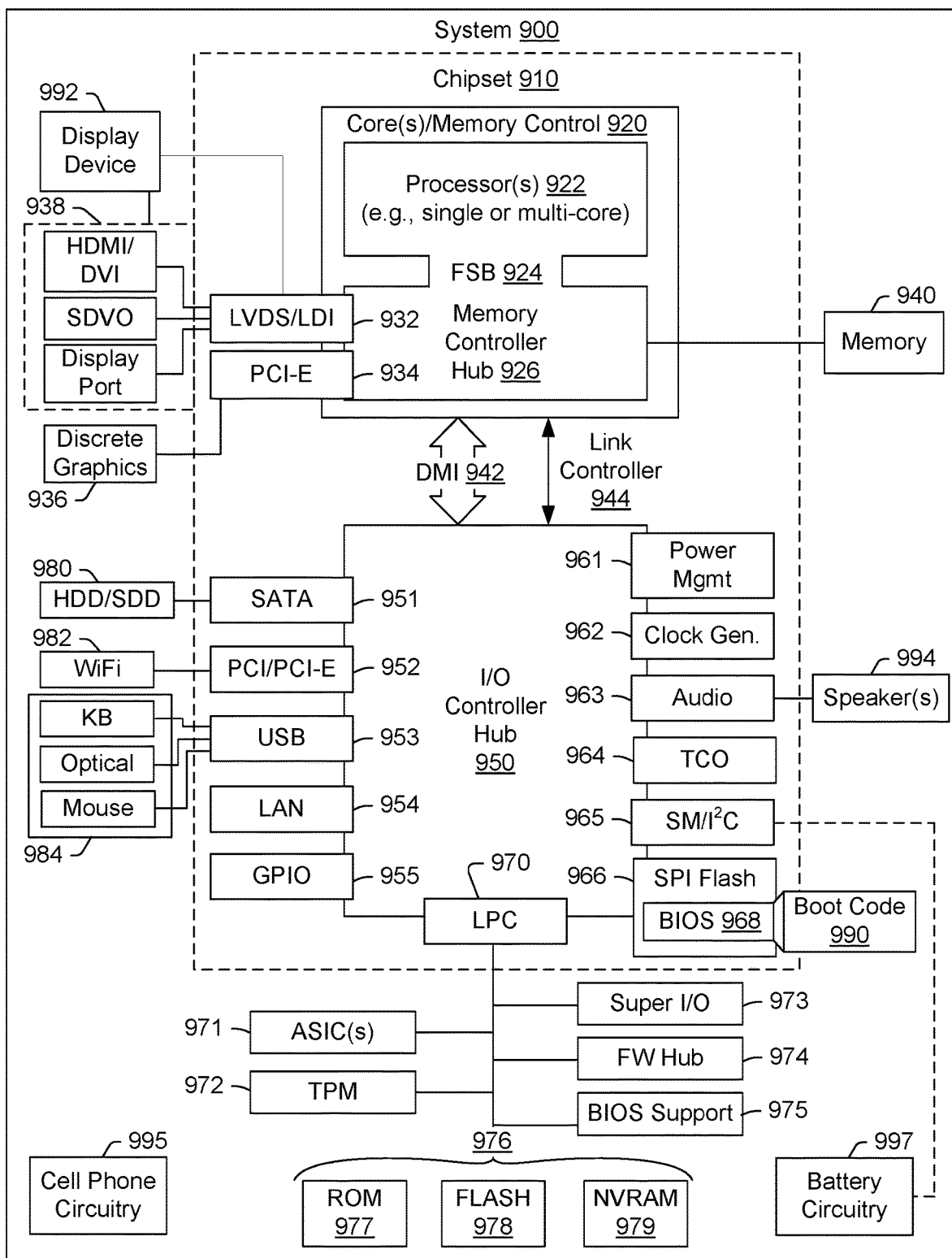
FIG. 9 is a diagram of an example of a system.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a device, a printer system, or other machine may include other features or only some of the features of the system 900. As an example, the system 900 may be utilized to generate and/or transmit a print job to a printer system (e.g., via one or more networks, etc.).

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I²C, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an I²C interface (see, e.g., the SM/I²C interface 965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
processing a training stack of transportable media to train a printer system to characterize one or more types of transportable media using one or more types of sensor-based measurements;
using the trained printer system, receiving at least one sensor-based measurement that characterizes a transportable medium loaded in the trained printer system;
determining that a match does not exist between a print job to be printed on a transportable medium and the characterized transportable medium loaded in the trained printer system; and
responsive to the determining that the match does not exist, issuing a signal.

2. The method of claim 1 wherein the issuing the signal comprises transmitting a notification to a device that generated the print job.

3. The method of claim 1 wherein the issuing the signal comprises issuing the signal to the trained printer system to purge the characterized transportable medium loaded in the trained printer system via a transport path of the trained printer system and, using the trained printer system, to receive at least one sensor-based measurement that characterizes another transportable medium loaded in the trained printer system.

4. The method of claim 3 wherein the purged characterized transportable medium is in a stack that comprises the other transportable medium.

5. The method of claim 1 wherein the issuing the signal comprises transmitting the print job to another printer system, wherein the transmitting is responsive to determining that a match exists between the print job and a characterized transportable medium loaded in the other printer system.

6. The method of claim 1 wherein the trained printer system comprises circuitry for acquiring a non-destructive sensor-based measurement and circuitry for acquiring a destructive sensor-based measurement and comprising selecting the circuitry for acquiring the non-destructive sensor-based measurement and acquiring a non-destructive sensor-based measurement, wherein receiving at least one sensor-based measurement comprises receiving the acquired non-destructive sensor-based measurement.

7. The method of claim 1 wherein the characterized transportable medium is a pre-printed form and where the print job is to be printed on a blank sheet of paper.

8. The method of claim 1 wherein the characterized transportable medium is a blank sheet of paper and where the print job is to be printed on a pre-printed form.

9. The method of claim 1 wherein the characterized transportable medium is a sheet of labels and where the print job is to be printed on a blank sheet of paper.

10. The method of claim 1 wherein the at least one sensor-based measurement comprises a camera-based measurement.

11. The method of claim 1 wherein the at least one sensor-based measurement comprises a friction measurement.

12. The method of claim 11 wherein the friction measurement corresponds to friction between the transportable medium as a sheet of a stack of sheets loaded in the trained printer system and another, adjacent sheet in the stack of sheets loaded in the trained printer system.

13. The method of claim 1 comprising analyzing the print job and determining that the match does not exist based at least in part on the analyzing.

14. The method of claim 13 wherein the analyzing comprises determining that the print job comprises a plurality of discrete character strings that are distributed spatially indicative of form fields.

15. The method of claim 13 wherein the print job is a multiple page print job and wherein the analyzing comprises determining that two or more pages of the multiple page print job comprise a plurality of discrete character strings that are distributed spatially indicative of form fields.

16. The method of claim 13 wherein the analyzing comprises identifying pronouns in the print job and, based at least in part on the identifying, determining that the print job is for a form.

17. The method of claim 13 wherein analyzing the print job comprises determining a memory size of the print job.

18. A printer system comprising:
a processor;
memory accessible to the processor;
at least one sensor operatively coupled to the processor; and
instructions stored in the memory executable to instruct the printer system to:
process a training stack of transportable media to train the printer system to characterize one or more types of transportable media using one or more types of sensor-based measurements;
receive at least one sensor-based measurement from at least one of the at least one sensor to characterize a transportable medium loaded in the trained printer system;
determine that a match does not exist between a print job to be printed on a transportable medium and the characterized transportable medium loaded in the trained printer system; and
responsive to the determination that the match does not exist, issue a signal.

19. A method comprising:
receiving at least one sensor-based measurement that characterizes a transportable medium loaded in a printer system;
determining that a match does not exist between a print job to be printed on a transportable medium and the characterized transportable medium loaded in the printer system; and
responsive to the determining that the match does not exist, issuing a signal,
wherein the issuing the signal comprises issuing the signal to the printer system to purge the characterized transportable medium loaded in the printer system via a transport path of the printer system and to receive at least one sensor-based measurement that characterizes another transportable medium loaded in the printer system, and
wherein the purged characterized transportable medium is in a stack that comprises the other transportable medium.

* * * * *